US012322564B2

(12) United States Patent
Kitajima et al.

(10) Patent No.: US 12,322,564 B2
(45) Date of Patent: Jun. 3, 2025

(54) RELAY

(71) Applicant: FCL Components Limited, Tokyo (JP)

(72) Inventors: Daishi Kitajima, Tokyo (JP); Kazuaki Miyanaga, Tokyo (JP); Mitsuyoshi Mizuhashi, Tokyo (JP)

(73) Assignee: FCL Components Limited, Tokyo (JP)

( * ) Notice: Subject to any disclaimer, the term of this patent is extended or adjusted under 35 U.S.C. 154(b) by 0 days.

(21) Appl. No.: 18/347,431

(22) Filed: Jul. 5, 2023

(65) Prior Publication Data

US 2023/0343536 A1 Oct. 26, 2023

Related U.S. Application Data

(62) Division of application No. 17/305,028, filed on Jun. 29, 2021, now Pat. No. 11,742,167.

(30) Foreign Application Priority Data

Jun. 30, 2020 (JP) ................................ 2020-113338

(51) Int. Cl.
*H01H 50/56* (2006.01)
*H01H 50/02* (2006.01)

(52) U.S. Cl.
CPC ............ *H01H 50/56* (2013.01); *H01H 50/02* (2013.01)

(58) Field of Classification Search
CPC ...... H01H 50/56; H01H 50/02; H01H 50/042; H01H 2001/265; H01H 50/548; H01H 50/64
USPC .......................................................... 335/189
See application file for complete search history.

(56) References Cited

U.S. PATENT DOCUMENTS 4,322,702 A * 3/1982 Bosch .................... H01H 50/02 335/278
4,748,294 A * 5/1988 Bartel .................. H01H 50/023 264/261
5,719,541 A * 2/1998 Mader .................. H01H 50/642 200/17 R
5,801,608 A 9/1998 Mader
5,808,533 A * 9/1998 Buscher ............... H01H 50/021 335/202
5,844,456 A * 12/1998 Mader .................... H01H 50/24 335/85

(Continued)

FOREIGN PATENT DOCUMENTS

CN 2927407 Y 7/2007
CN 102157824 A 8/2011

(Continued)

OTHER PUBLICATIONS

Extended Search Report from counterpart European Application No. 21182519.5, dated Nov. 23, 2021, 10 pp.

(Continued)

*Primary Examiner* — Shawki S Ismail
*Assistant Examiner* — Lisa N Homza
(74) *Attorney, Agent, or Firm* — Shumaker & Sieffert, P.A.

(57) ABSTRACT

A relay includes an electromagnet, a plurality of springs having contacts which open and close in accordance with operation of the electromagnet and terminals, and a base which supports the springs, wherein at least one of the plurality of springs has a locked part which is locked on the base using resilience of the spring, and the base has a lock part which locks the locked part.

4 Claims, 23 Drawing Sheets

(56) References Cited

U.S. PATENT DOCUMENTS

| | | | | |
|---|---|---|---|---|
| 6,426,689 | B1 | 7/2002 | Nakagawa et al. | |
| 6,765,463 | B2 | 7/2004 | Mader et al. | |
| 6,940,375 | B2 | 9/2005 | Sanada et al. | |
| 2002/0024412 | A1 | 2/2002 | Wu | |
| 2003/0016104 | A1* | 1/2003 | Mader | H01H 50/042 335/129 |
| 2005/0057332 | A1* | 3/2005 | Nakamura | H01H 50/042 335/78 |
| 2008/0231395 | A1* | 9/2008 | Minowa | H01H 50/642 335/189 |
| 2008/0231397 | A1* | 9/2008 | Katou | H01H 50/642 335/192 |
| 2014/0203893 | A1 | 7/2014 | Kando et al. | |
| 2014/0203898 | A1* | 7/2014 | Li | H01H 50/042 335/189 |
| 2015/0116061 | A1* | 4/2015 | Fujimoto | H01H 50/36 335/189 |
| 2020/0043687 | A1 | 2/2020 | Kobayashi et al. | |
| 2021/0159036 | A1* | 5/2021 | Ikushima | H01H 50/24 |
| 2021/0407754 | A1* | 12/2021 | Kitajima | H01H 50/023 |
| 2023/0121441 | A1* | 4/2023 | Takahashi | H01H 50/54 335/185 |

FOREIGN PATENT DOCUMENTS

| | | | |
|---|---|---|---|
| DE | 2728509 | A1 | 1/1979 |
| DE | 19606883 | C1 | 4/1997 |
| EP | 0691667 | A1 | 1/1996 |
| FR | 2452777 | A1 | 10/1980 |
| JP | H02145752 | U | 12/1990 |
| JP | 2000285782 | A | 10/2000 |
| JP | 2001143594 | A | 5/2001 |
| JP | 2003045309 | A | 2/2003 |
| JP | 2004164949 | A | 6/2004 |
| JP | 2006012565 | A | 1/2006 |
| JP | 200659702 | A | 3/2006 |
| JP | 2007299610 | A | 11/2007 |
| JP | 202021594 | A | 2/2020 |
| JP | 2020021594 | A | 2/2020 |

OTHER PUBLICATIONS

Prosecution History from U.S. Appl. No. 17/305,028, dated May 26, 2022 through Jun. 30, 2023, 46 pp.

First Office Action and Search Report, and translation thereof, from counterpart CN Application No. 202110733924.2 dated Nov. 29, 2023, 10 pp.

Notification of Reason for Refusal, and translation thereof, from counterpart Japanese Application No. 2020-113338 dated Jan. 17, 2024, 6 pp.

Office Action from U.S. Appl. No. 18/347,425 dated Mar. 1, 2024, 7 pp.

Response to Office Action dated Mar. 1, 2024 from U.S. Appl. No. 18/347,425, filed May 29, 2024, 5 pp.

Final Office Action from U.S. Appl. No. 18/347,425 dated Aug. 28, 2024, 6 pp.

Notification of Reason for Refusal, and translation thereof, from counterpart Japanese Application No. 2020-113338 dated Aug. 29, 2024, 6 pp.

Advisory Action from U.S. Appl. No. 18/347,425 dated Dec. 9, 2024, 3 pp.

Notice of Allowance from U.S. Appl. No. 18/347,425 dated Jan. 27, 2025, 7 pp.

Office Action, and translation thereof, from counterpart Japanese Application No. 2020-113338 dated Jan. 21, 2025, 5 pp.

Response to Final Office Action dated Aug. 28, 2024 from U.S. Appl. No. 18/347,425, filed Nov. 27, 2024, 5 pp.

Supplemental Notice of Allowance from U.S. Appl. No. 18/347,425 dated Feb. 21, 2025, 2 pp.

* cited by examiner

RELAY

CROSS-REFERENCE TO RELATED APPLICATIONS

This application is a Divisional of Ser. No. 17/305,028, filed Jun. 29, 2021, which claims priority to Japanese Patent Application No. 2020-113338, filed on Jun. 30, 2020, the entire contents of which are incorporated herein by reference.

BACKGROUND

1. Field

The disclosure herein relates to a relay (an electromagnetic relay).

2. Description of the Related Art

In small relays having a rated load capacity level of approximately 8 to 10 A, when inserting springs comprising contacts and terminals into a base, due to the small size thereof, it is difficult to secure a sufficient press-fitting allowance, whereby there are problems such as insufficient press-fitting strength and various trade-offs for obtaining press-fitting strength. Thus, in relays, for example, measures which are described later are adopted, whereby in many cases, commercialization is difficult due to manufacturing processes, productions costs, etc.

If the springs remain thin, resilience can be maintained, but there is a risk of deformation during the press-fitting process, and as such, the springs are commonly made thicker, and press-fit firmly with a small press-fitting allowance.

Only the terminal portions of the springs are made thick, and the spring portions which remain thin are welded to the terminal portions with thin plates. However, in this case, the processing cost increases.

When press-fitting strength cannot be secured, the springs are temporarily bonded after insertion of the springs. However, in this case, production costs increase, and when a load is applied to the spring terminals between the time when springs are inserted into the base and the time when temporary bonding is performed, there is also a risk of temporary bonding in a state in which the springs are displaced from the correct positions.

Furthermore, in the contact of relay contacts, one point contact, sliding contact in which the contacts rub against each other, rolling contact in which the contacts roll against each other, etc., are known. When the contacts rub, the contact cleaning actions such as destruction of oxide films on the contact surface and scraping of consumable powder occurs, whereby contact reliability is improved. Furthermore, if the contact resistance between the contacts is low, heat generation can be suppressed. In the case of rolling contact, though the cleaning effect of the contacts is reduced, a large change in the contact points between contacts can be expected, and the welding resistance at the time of contact between the contacts is improved.

In the case of sliding-type relays, if large irregularities occur on the contacts due to contact wear, extra force is required for the contacts to overcome the unevenness when sliding, and if that force exceeds the attraction of the electromagnet for pressing the springs, there is a risk that the card will not push the spring completely. In order to suppress such an event, there is an idea of lowering the stiffness of the springs and providing a margin to the attractive force of the electromagnet, but in that case, it is necessary to carefully design in consideration of energizing capacity of the springs.

SUMMARY

An aspect of the present disclosure provides a relay, comprising an electromagnet, a plurality of springs comprising contacts which open and close in accordance with operation of the electromagnet, and terminals, and a base which supports the springs, wherein at least one of the plurality of springs has a locked part which is locked on the base using resilience of the spring, and the base has a lock part which locks the locked part.

Another aspect of the present disclosure provides a relay, comprising an electromagnet, a plurality of springs comprising contacts which open and close in accordance with operation of the electromagnet, and terminals, a base which supports the springs, and a cover which covers the base, wherein a step for securing an adhesive layer between the base and the cover is formed on an outside surface of the base opposite an inside surface of the cover or on the inside surface of the cover opposite the outside surface of the base.

Another aspect of the present disclosure provides a relay, comprising an electromagnet, a plurality of springs comprising contacts which open and close in accordance with operation of the electromagnet, and terminals, and a base which supports the springs, wherein the base comprises a reference surface defining a reference position of the springs, and insertion holes for insertion of the terminals, inside surfaces of the insertion holes correspond to the reference surface, and the base comprises notches on the reference surface side near terminal outlets of the insertion holes.

Yet another aspect of the present disclosure provides a relay, comprising a base, an electromagnet mounted on the base, a moving member which moves in accordance with operation of the electromagnet, and a movable spring which comprises a base part which is supported by the base, and a main spring part which extends from the base part and which has a movable contact on the tip side thereof, wherein the moving member has first and second protrusions which press both side parts of the movable contact of the movable spring, and the movable spring comprises an elongate part which is formed so as to extend from a portion of the main spring part on which the movable contact is provided toward a position where the movable spring is pressed by the first protrusion, and, on the side opposite the side where the elongate part is present relative to the movable contact, a branch part which branches from a portion of the main spring part between the portion where the movable contact is provided and the base part and which extends to a position where the movable spring is pressed by the second protrusion.

Yet another aspect of the present disclosure provides a relay, comprising an electromagnet, a plurality of springs comprising contacts which open and close in accordance with operation of the electromagnet, and terminals, and a base which supports the springs, wherein an insertion hole for insertion of at least one terminal of the plurality of springs is formed in the base, and the insertion hole is formed in a recess which is formed in the base in an interior space of the relay and which has a spatial size larger than a size of an aperture of the insertion hole on the interior space side.

Yet another aspect of the present disclosure provides a relay, comprising a base, an electromagnet mounted on the base, a movable spring provided with a movable contact, and a fixed spring comprising a base part which is supported by the base and a spring part which extends from the base part and which is provided with a fixed contact, wherein the base comprises, on the movable spring side relative to the fixed spring, a position regulation part which is formed so as to stand upright from a bottom surface of the base, and which has a surface which contacts a region of the spring part from a connection position with the base part to a predetermined height when the fixed spring falls to the movable spring side due to pressing reaction by the movable spring.

BRIEF DESCRIPTION OF THE DRAWINGS

FIG. 21C is a view in which FIG. 21B is viewed from above.

DETAILED DESCRIPTION

Figure 1:
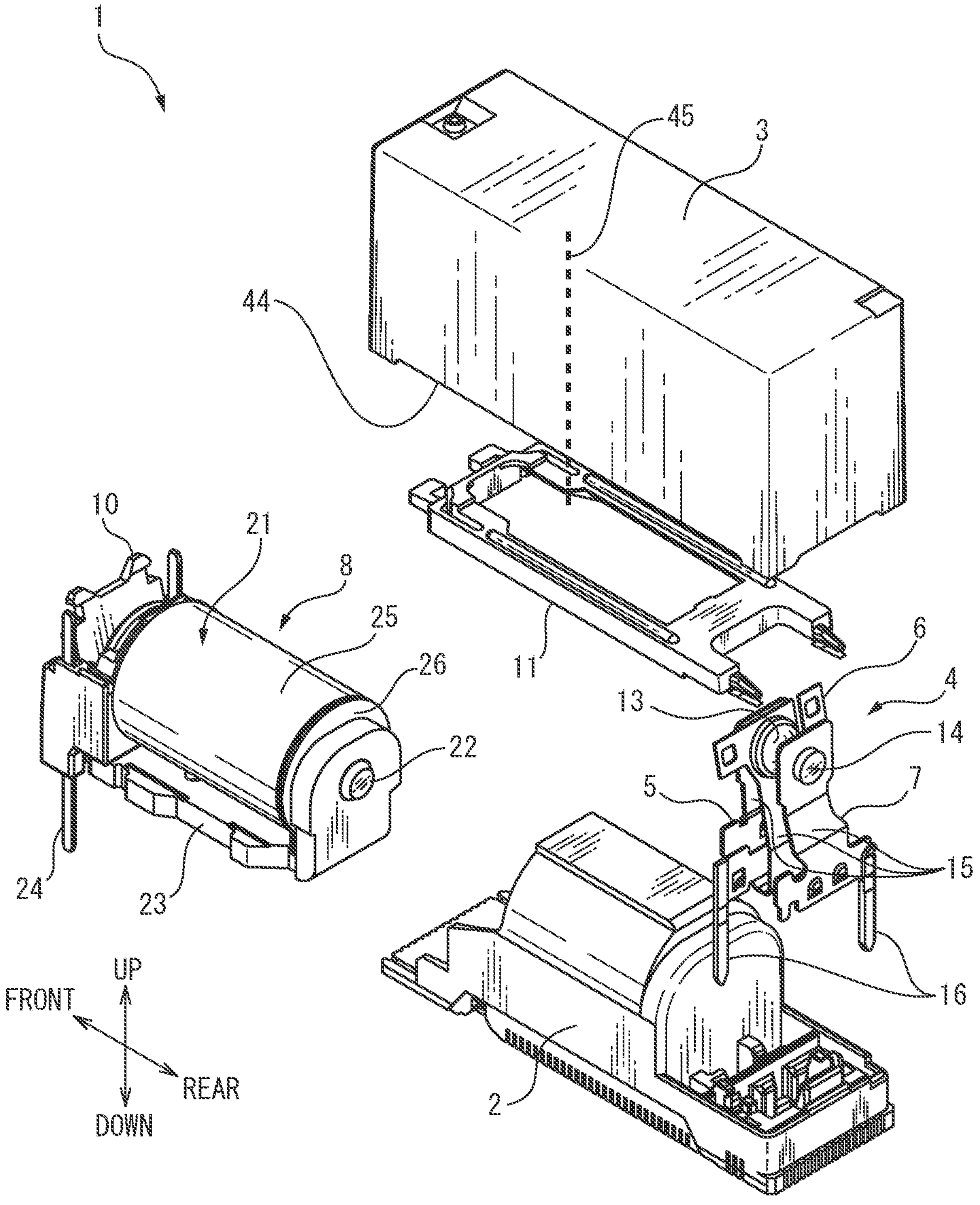
FIG. 1 is an exploded perspective view showing an example of a relay.

The embodiments of the present disclosure will be described in detail below with reference to the attached drawings. In the drawings, identical or similar elements are assigned the same or similar reference numerals. Furthermore, the embodiments described below do not limit the technical scope of the inventions described in the claims or the definitions of the terms.

Figure 2:
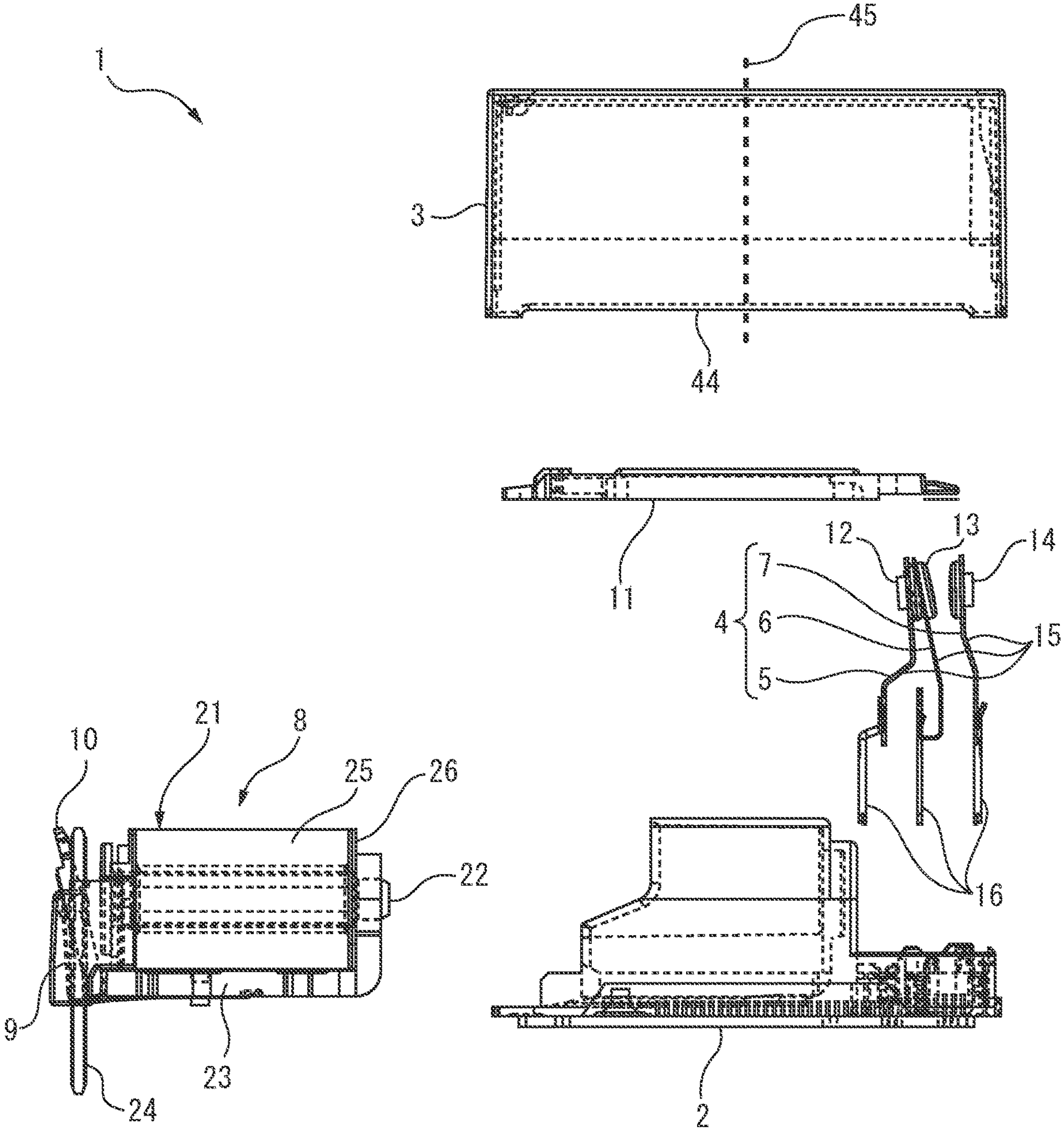
FIG. 2 is an exploded side view showing an example of a relay.
Figure 3:
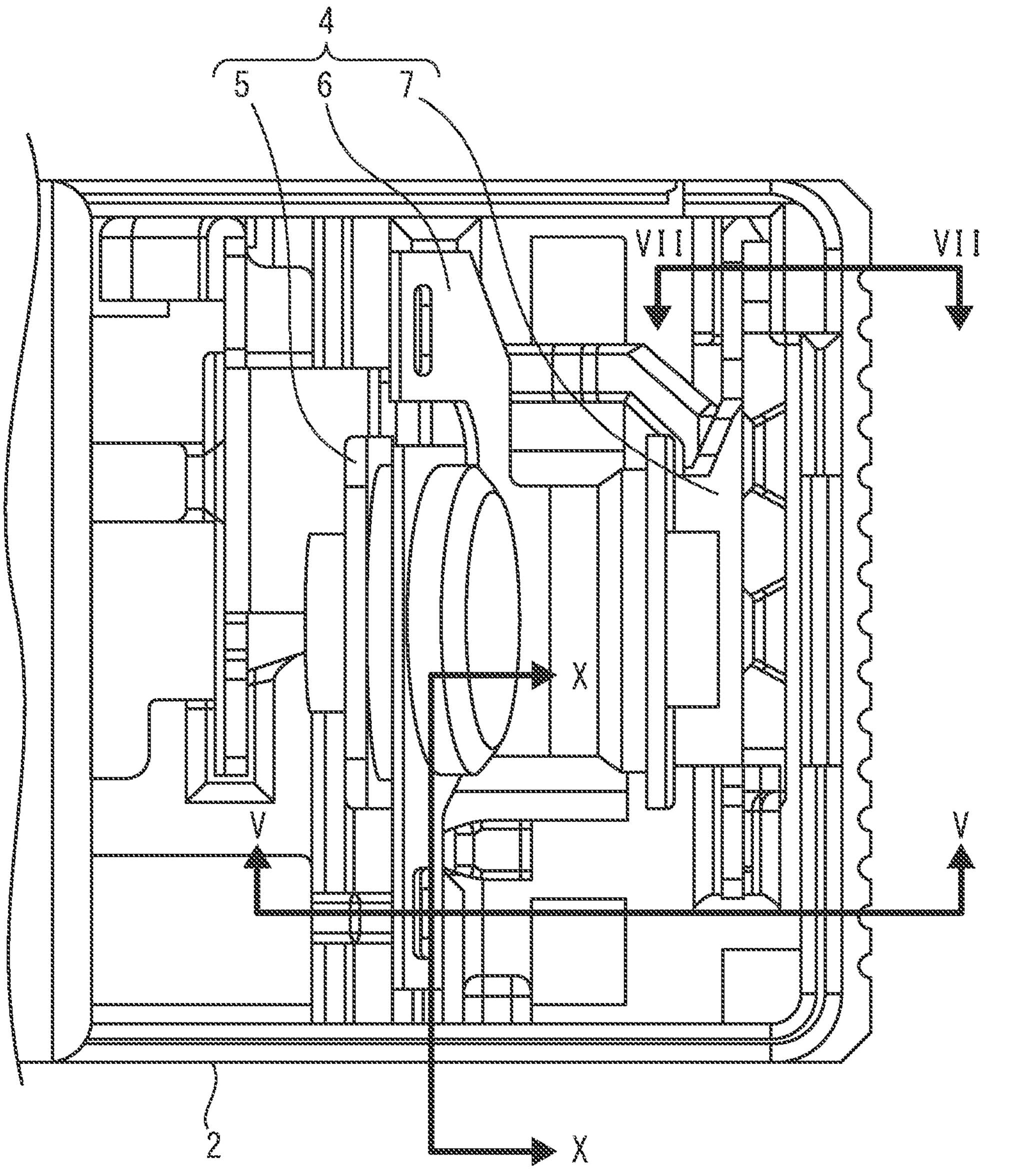
FIG. 3 is a plan view showing a part of a relay.

FIGS. 1 and 2 are an exploded perspective view and an exploded side view, respectively, of an example of a relay 1, and FIG. 3 is a partial plan view of the relay 1. The relay 1 comprises a base 2 on which components are assembled, and a box-shaped cover 3 which covers the base 2. For example, the base 2 and the cover 3 may be resin molded. The components assembled on the base 2 include an electromagnet 8, a hinge spring 9, an armature 10, a card 11, and springs 4 each of which comprising a contact which are opened and closed with another contact.

The springs 4 include a first fixed spring 5, a movable spring 6, and a second fixed spring 7, which are each formed from metal. The first fixed spring 5 comprises a first fixed contact 12, the movable spring 6 comprises a movable contact 13, and the second fixed spring 7 comprises a second fixed contact 14. Furthermore, each of the springs 4 has a spring part 15 and a terminal 16. For example, the spring part 15 is formed as a plate spring. The spring part 15 and the terminal 16 may be welded and joined, or may be formed from a single thin plate.

The electromagnet 8 comprises a coil assembly 21, an iron core 22, and a yoke 23. The coil assembly 21 comprises two terminals 24, a bobbin 26, and a coil 25 wounded around the bobbin 26 and connected to the terminals 24.

In the relay 1, the electromagnet 8 is excited by applying a voltage between the terminals 24. The armature 10 swings by excitation of the electromagnet 8 and is attracted to the iron core 22. The card 11 is attached to the armature 10, presses the movable spring 6 as the armature 10 swings, and brings the movable contact 13 which has been in contact with the first fixed contact 12 into contact with the second fixed contact 14. The hinge spring 9 attached to the armature 10 and the yoke 23 elastically biases one end of the armature 10 in a direction away from the iron core 22.

When the voltage application to the terminals 24 is stopped, the armature 10 returns to an initial position as moves away from the iron core 22 by the biasing force of the hinge spring 9. As the armature 10 returns to the initial position, the pressing force from the card 11 to the movable spring 6 is released, and the movable contact 13 separates from the second fixed contact 14.

By the above structure, the relay 1 opens and closes the first fixed contact 12 and the movable contact 13, as well as the movable contact 13 and the second fixed contact 14. The above-described structure is one example, and any components and principles may be adopted.

Figure 4:
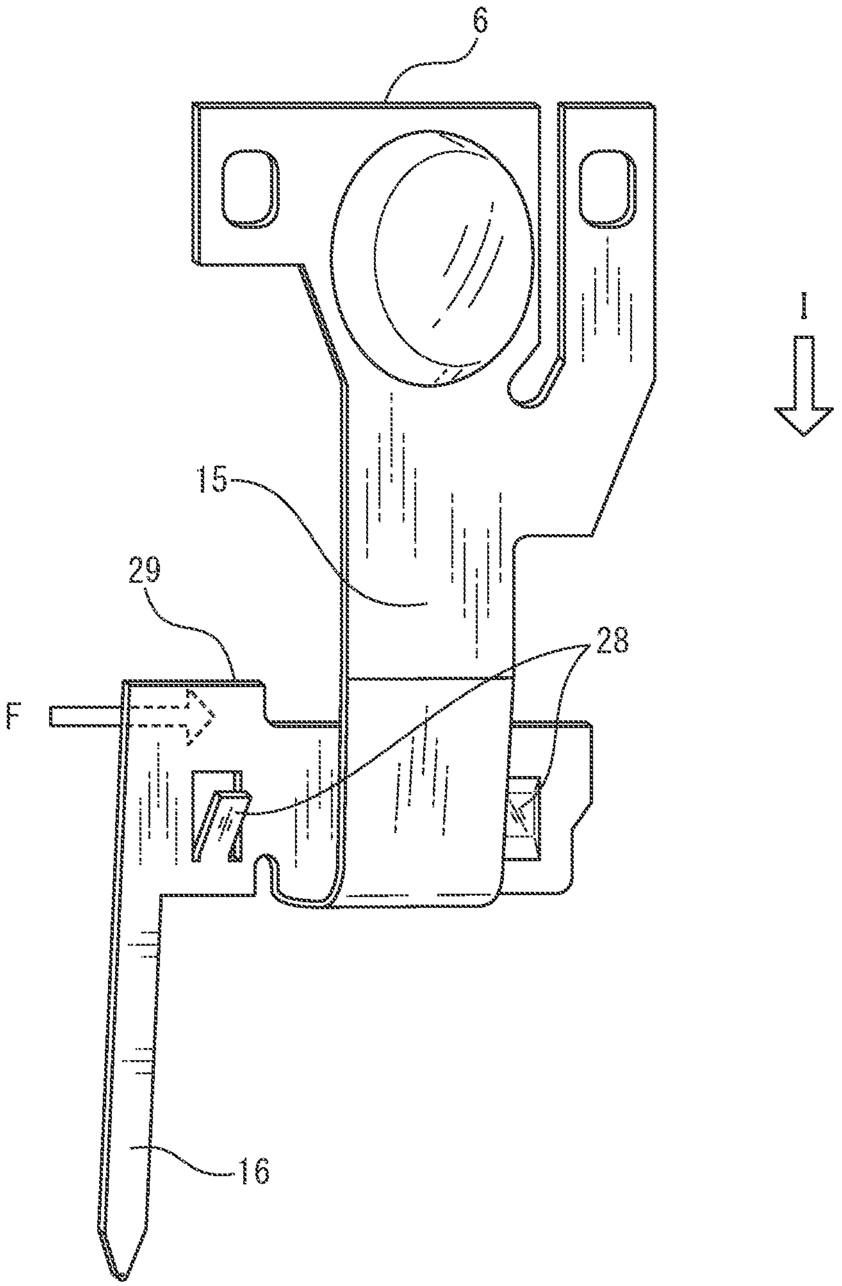
FIG. 4 is a perspective view showing an example of a movable spring.
Figure 5A:
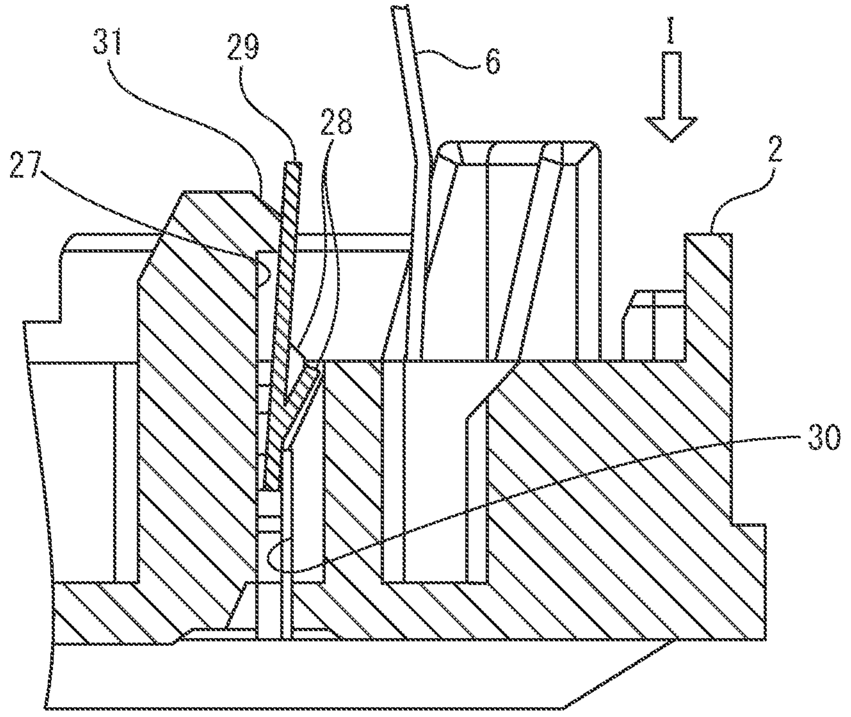
FIG. 5A is a view of cross section V-V showing an example of a spring structure.
Figure 5B:
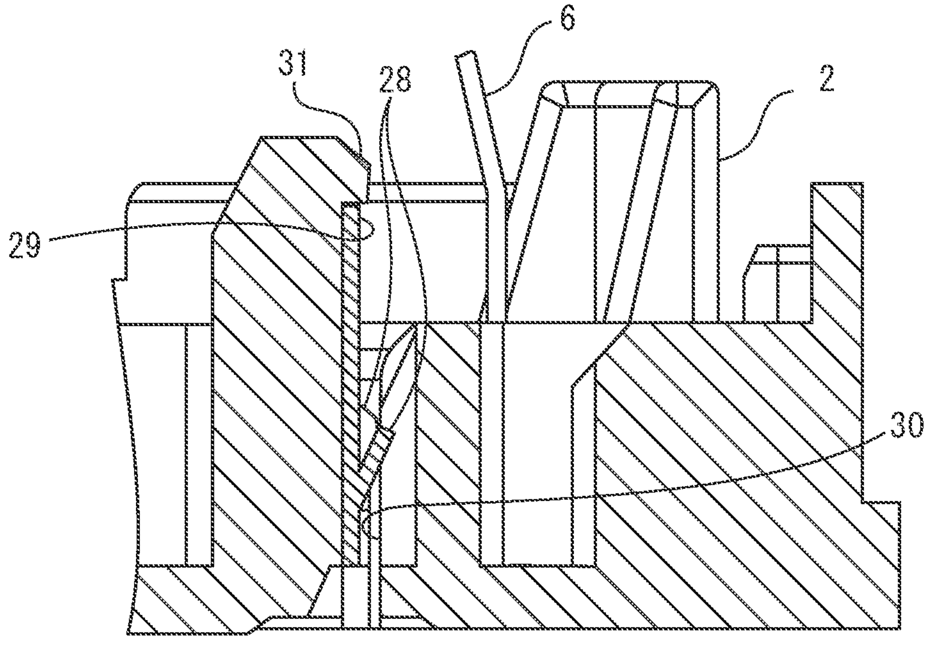
FIG. 5B is a view of cross-section V-V showing an example of a spring structure.

FIG. 4 is a perspective view of an example of the movable spring 6, and FIGS. 5A and 5B are views of cross-section V-V of the example of the spring structure. The movable spring 6 comprises raised parts 28 which press the movable spring 6 against a reference surface 27, and a locked part 29 which is locked on the base 2. In FIG. 4, the U-shaped end part formed on the spring part 15 serves as the locked part 29. The U-shaped end part is formed so as to face rearward in an insertion direction I of the movable spring 6. When the locked part 29 receives an external force F, it is elastically deformed due to the resilience, and when the external force F is released, the locked part 29 is restored to its original shape.

The base 2 comprises a reference surface 27 which defines the reference position of the movable spring 6 when attaching the movable spring 6 to the base 2, a press-fitting surface 30 which faces the reference surface 27, and a lock part 31 which locks the movable spring 6. For example, the claw-shaped protrusion formed on the reference surface 27 serves as the lock part 31, and the protrusion may project in a direction different from the insertion direction I. The different direction may be a direction orthogonal to the insertion direction I, a direction inclined forward in the insertion direction I, etc., as long as the locked part 29 can be locked. Furthermore, the protrusion may not be formed on the reference surface 27, but may be formed on a surface orthogonal to the reference surface 27. In the initial stage of inserting the movable spring 6 shown in FIG. 5A into the base 2, the raised parts 28 come into contact with the press-fitting surface 30, and the locked part 29 comes into contact with the lock part 31. The locked part 29 contacting the lock part 31 elastically deforms. In the later stage of inserting the movable spring 6 shown in FIG. 5B, the raised parts 28 contacting the press-fitting surface 30 presses the movable spring 6 against the reference surface 27, and the locked part 29 slides under the lock part 31 by its restoring force and engages with the lower part of the lock part 31. The movable spring 6 is so self-locked in the insertion process to prevent disengagement of the movable spring 6. Since the lock part 31 limits the movement of the locked part 29 in the direction opposite to the insertion direction I, disengagement of the movable spring 6 can be prevented.

In the relay 1 described herein, the movable spring 6 is of a type which is vertically inserted into the base 2. However, the movable spring may be of a type which is laterally inserted.

As described above, the press-fitting strength of the spring can be reduced and spring disengagement can be prevented even for thin springs. Therefore, the spring structure of the present example can be advantageously used, in particular, in small relays. Since the movable spring 6 is inserted using the resilience of the locked part 29, mold scraping and wear debris during press-fitting are reduced. Further, the temporary bonding of the movable spring and drying processes can be abolished, which leads to reductions in equipment costs, product costs, etc. Further, the potential risk of spring disengagement in the process from spring insertion to bonding is eliminated.

Figure 6:
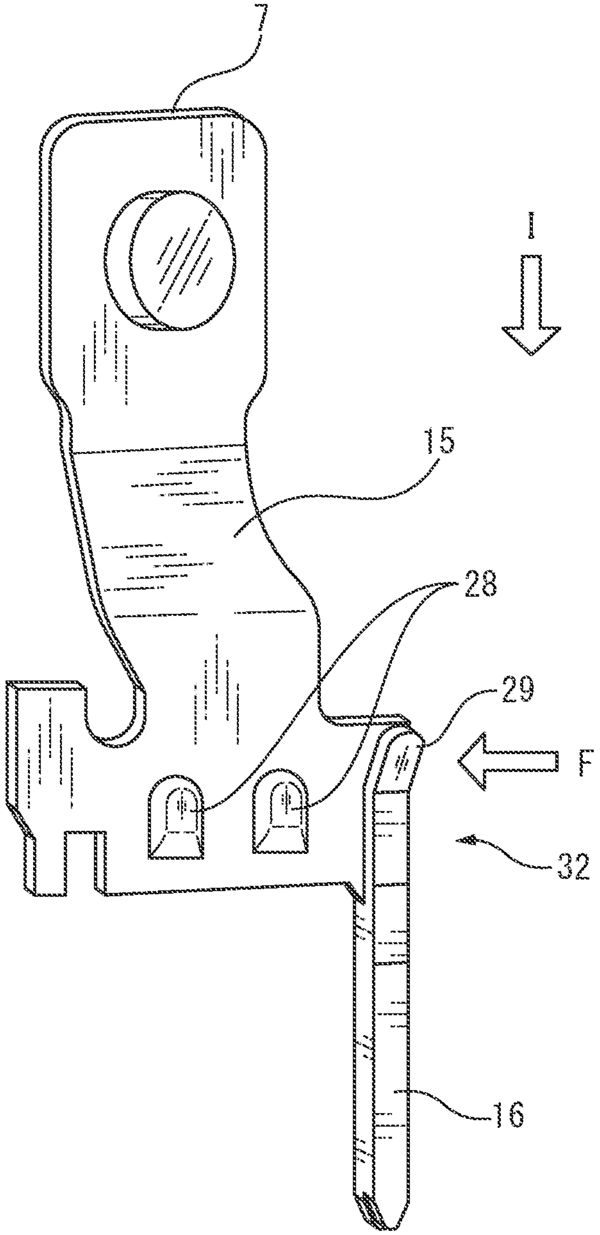
FIG. 6 is a perspective view showing an example of a second fixed spring.
Figure 7:
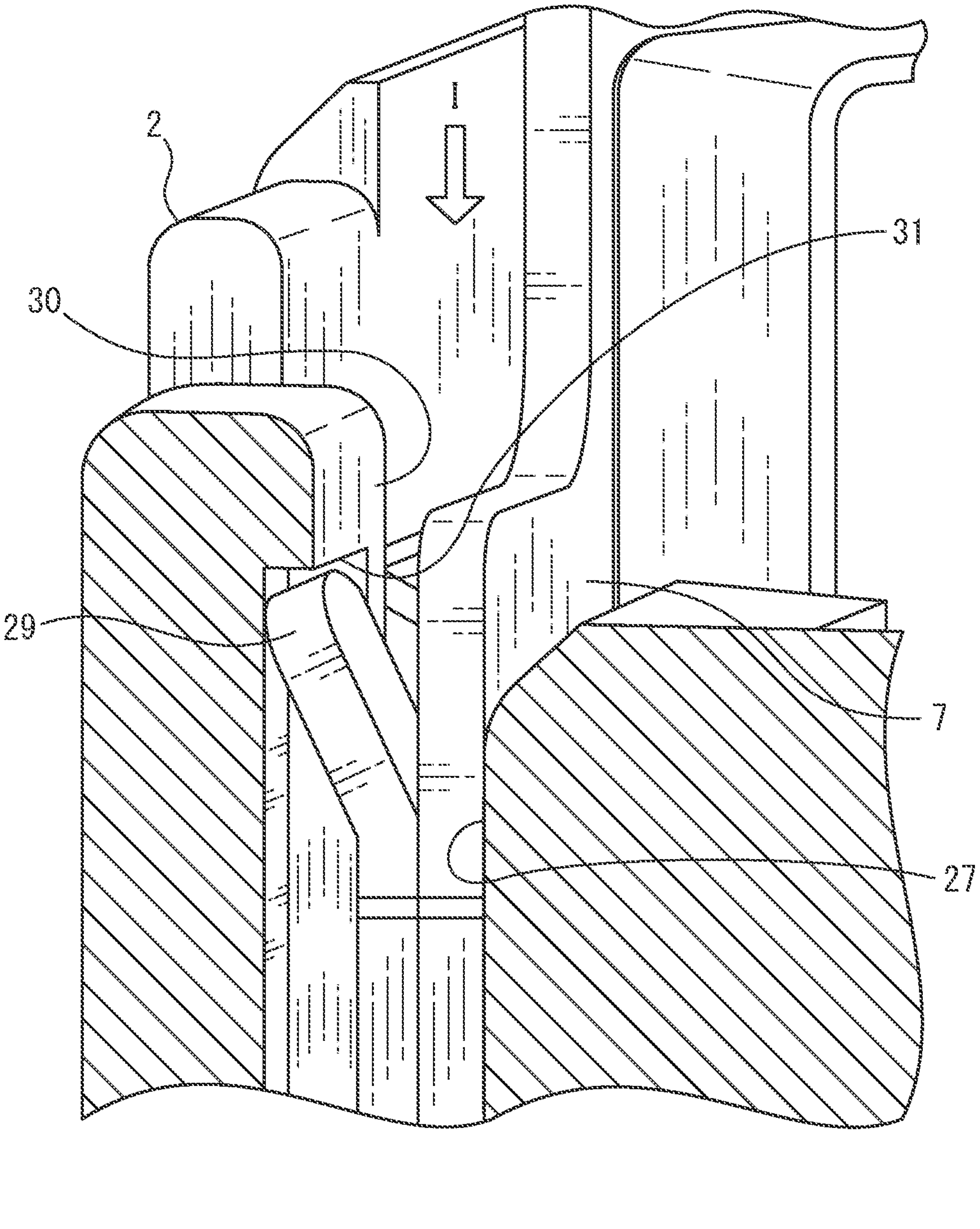
FIG. 7 is a perspective view of cross-section VII-VII showing another example of a spring structure.

The self-locking structure of the present example may be used for the first fixed spring 5 or the second fixed spring 7. FIG. 6 is a perspective view of an example of the second fixed spring 7, and FIG. 7 is a perspective view of cross-section VII-VII of the spring structure of another example. The second fixed spring 7 comprises raised parts 28 which press the second fixed spring 7 against the reference surface 27, and a locked part 29 which is locked on the base 2. For example, an inclined end part in which a root 32 of the terminal 16 is obliquely raised serves as the locked part 29, and the end part is formed so as to face rearward in the insertion direction I. When the locked part 29 receives an external force F, the locked part 29 is elastically deformed due to the resilience, and when the external force F is released, the locked part 29 is restored to its original shape.

The base 2 comprises the reference surface 27 defining the reference position of the second fixed spring 7, a press-fitting surface 30 facing the reference surface 27, and a lock part 31 which locks the second fixed spring 7. For example, the edge of the recess formed on the press-fitting surface 30 side serves as the lock part 31. The edge extends in a direction different from the insertion direction I. The edge includes not only the portion of the side wall of the recess but also the portion of the press-fitting surface 30. In the initial stage of inserting the second fixed spring 7 into the base 2, each of the raised parts 28 (not illustrated in FIG. 7) comes into contact with the press-fitting surface 30, and the locked part 29 comes into contact with the press-fitting surface 30 and elastically deforms (not illustrated). In the later stage of inserting the second fixed spring 7 into the base 2, the raised parts 28 contacting the press-fitting surface 30 press the second fixed spring 7 against the reference surface 27, and the locked part 29 is fitted in the lock part 31 due to the restoring force and engages with the lock part 31. The second fixed spring 7 is so self-locked in the insertion process. Since the lock part 31 limits the movement of the locked part 29 in the direction opposite to the insertion direction I, disengagement of the second fixed spring 7 can be prevented.

Figure 8A:
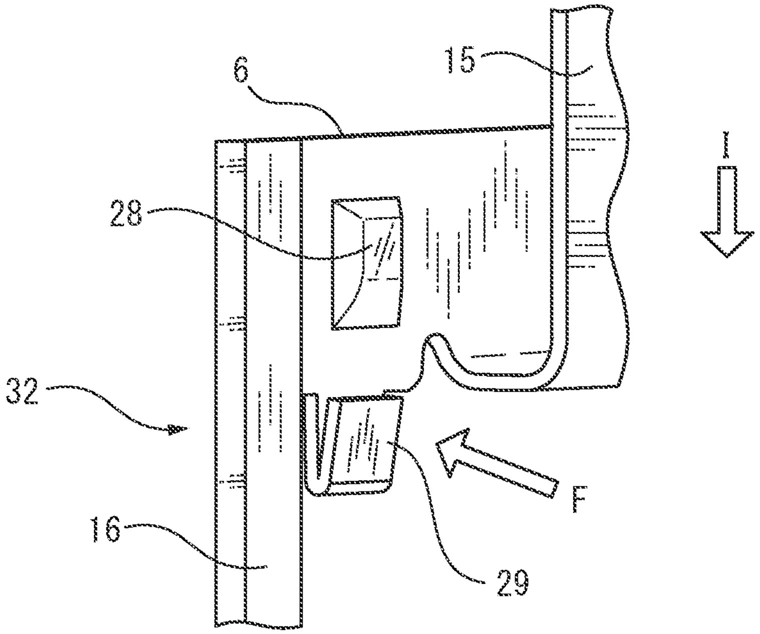
FIG. 8A is a partial perspective view showing a modified example of a locked part.
Figure 8B:
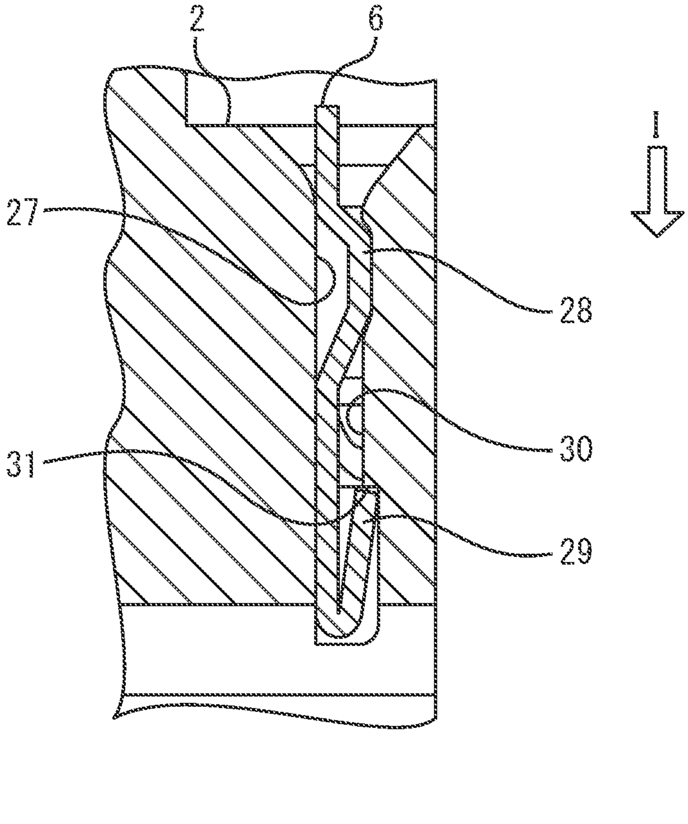
FIG. 8B is a partial cross-sectional view showing a modified example of a spring structure.

FIG. 8A is a partial perspective view showing a modified example of the locked part 29 of the movable spring 6, and FIG. 8B is a partial cross-sectional view showing a modified example of the self-locking structure.

In FIG. 8A, a V-shaped end part formed near the root of the terminal 16 serves as the locked part 29. The end part is formed so as to face rearward in the insertion direction I. When the locked part 29 receives an external force F, the locked part 29 is elastically deformed due to resilience, and when the external force F is released, the locked part 29 is restored to its original shape. In FIG. 8B, the edge of the recess formed in the press-fitting surface 30 serves as the lock part 31. The edge extends in a direction different from the insertion direction I. In the initial stage of inserting the movable spring 6 into the base 2, the locked part 29 comes into contact with the press-fitting surface 30, receives a force from the press-fitting surface 30, and is elastically deformed. In the latter stage of inserting the movable spring 6 into the base 2, the locked part 29 slides under the lock part 31 due to the restoring force and engages with the lock part 31. The movable spring 6 is so self-locked in the insertion process. Since the lock part 31 limits the movement of the locked part 29 in the direction opposite to the insertion direction I, disengagement of the movable spring 6 can be prevented.

Figure 9A:
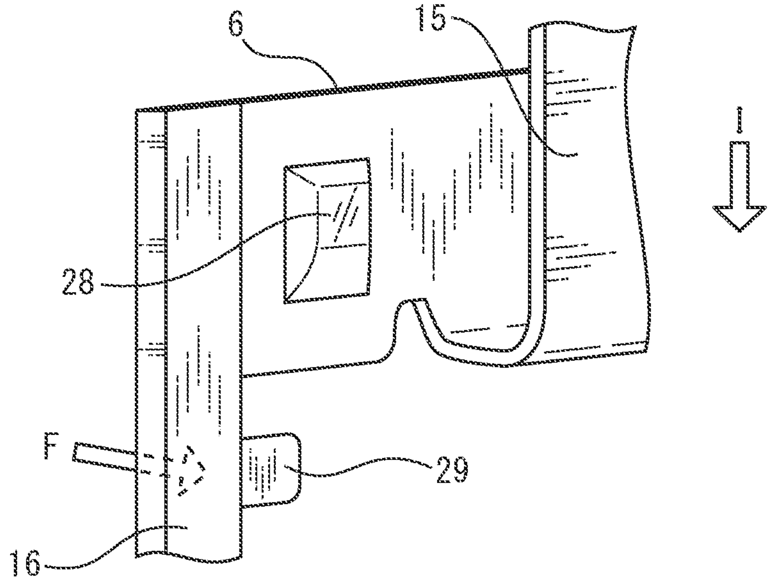
FIG. 9A is a partial perspective view showing another modified example of a locked part.
Figure 9B:
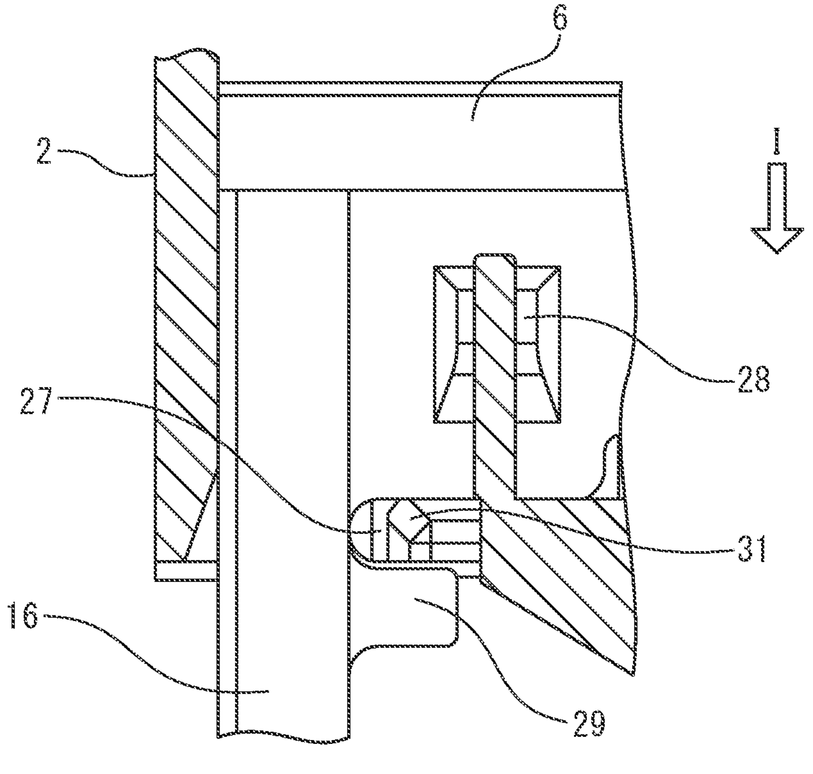
FIG. 9B is a cross-sectional view showing another modified example of a spring structure.

FIG. 9A is a partial perspective view showing another modified example of the locked part 29, and FIG. 9B is a cross-sectional view showing another modified example of the self-locking structure. The locked part 29 of FIG. 9A is a protrusion projecting laterally from the terminal 16, and is formed so as to face laterally in the insertion direction I. When the locked part 29 receives an external force F, the locked part 29 elastically deforms due to resilience, and when the external force F is released, the locked part 29 is restored to its original shape. The lock part 31 of FIG. 9B is a claw-like protrusion projecting from the reference surface 27 in a direction different from the insertion direction I.

The raised parts 28 may be a half-blanked protrusion as illustrated on the right side of FIG. 4. However, when using any one of the spring displacement locking structures described above, a cut piece formed by cutting and raising a part of the movable spring 6 as the raised part 28 as illustrated on the left side of FIG. 4 may be suitable.

Figure 10A:
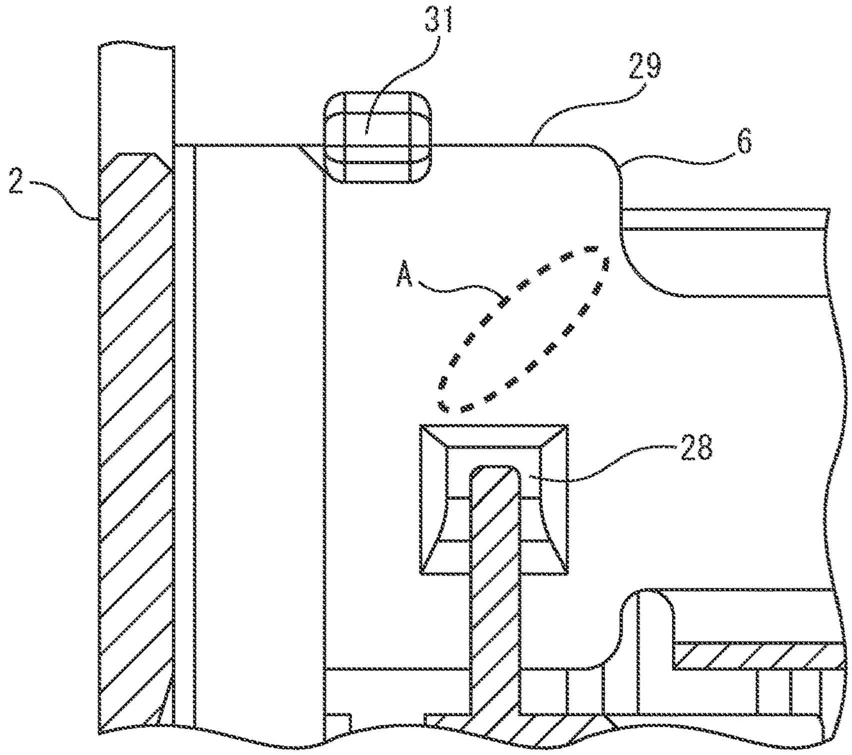
FIG. 10A is a cross-sectional view showing a stress range of the case in which a raised part is in the form of a protrusion.
Figure 10B:
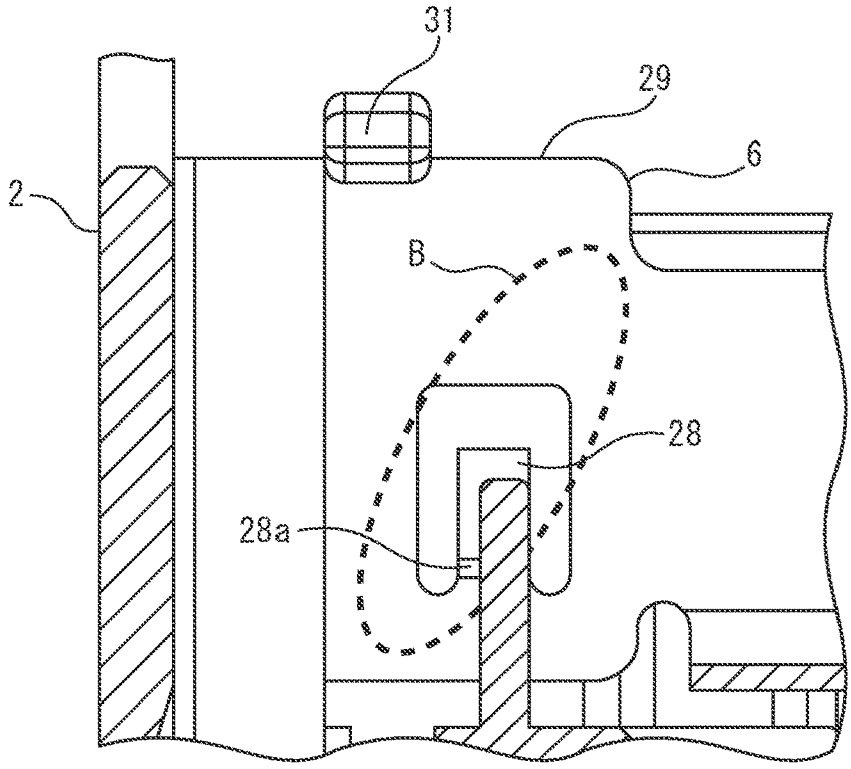
FIG. 10B is a cross-sectional view showing a stress range of the case in which a raised part is in the form of a cut and raised piece.

FIG. 10A is a cross-sectional view showing a range A of spring stresses when the raised part is a protrusion, and FIG. 10B is a view of cross-section X-X showing a range B of spring stresses when the raised part is a cut and raised piece. Both FIG. 10A and FIG. 10B illustrates states in which the movable spring 6 is riding over the lock part 31. FIGS. 10A and 10*b* correspond to the states between the states illustrated in FIGS. 5A and 5B, from the viewpoint of the contact state between the locked part 29 and the lock part 30.

When attaching the movable spring 6 to the base 2, the movable spring 6, especially a portion above the raised 29, is deformed by the height of the lock part 31 when the locked part 29 rides over the lock part 31. In this case, it is necessary to absorb the height of the lock part 31 with spring property of the movable spring 6. At the same time, a portion of the movable spring 6 in which the raised part 29 is provide is pressed toward the reference surface 27 as the raised part 29 contacts with the press-fitting surface 30.

When the raised part 28 is a protrusion, stress may be concentrated in a relatively narrow range A of the movable spring 6 between the lock part 31 and the raised part 28, depending on the distance between the lock part 31 and the raised part 28. In this case, the spring may be plastically deformed, leading to a decrease in self-locking performance.

In order to relax the stress while maintaining the raised part 28 in the shape of protrusion, the stress can be dispersed by widening the spring width or providing the lock part 31 at a higher position of the base 2. However, if applying such structure to a small relay, the insulation distance and the width of the spring roll material may also be affected.

From the viewpoint of suppressing plastic deformation of the spring, stress dispersion can be achieved by forming the raised part 28 as a cut and raised piece rather than as a protrusion.

When the raised part 28 is formed as a cut and raised piece, the raised part 28 deforms when the movable spring 28 is attached to the base 2. The deformed raised part 28 absorbs the stress generated when the locked part 29 rides over overlaps the lock part 31 and the movable spring 6 elastically deforms by the height of the lock part 31. Further, the distance between the lock part 31 and the root 28*a* of the cut and raised piece is relatively long. Therefore, stress is dispersed over a relatively wide range B of the movable spring 6 that includes a portion in which the raised part 28 is formed, and plastic deformation of the spring can be suppressed. A cut and raised piece may be provided on the first fixed spring 5 or the second fixed spring 7.

Figure 11:
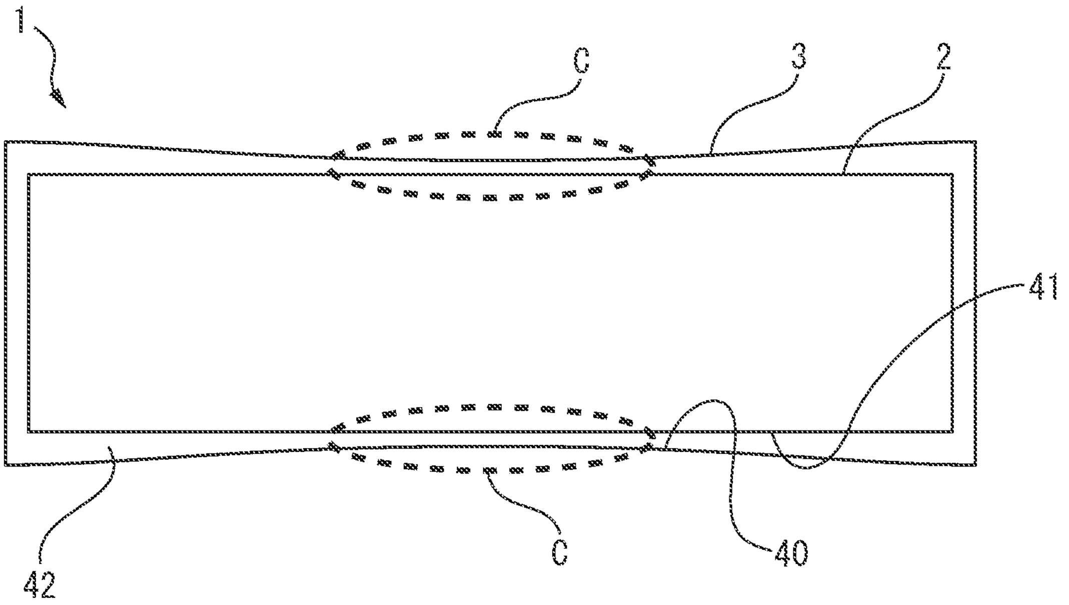
FIG. 11 is a view showing the influence of cover inward warping.

The cover 3 is thin, and accordingly, the cover 3 may warp inwardly during molding. FIG. 11 is a view showing the influence in inward warping of the cover 3. The base 2 has an outside surface 41 facing the inside surface 40 of the cover. If the outside surface 41 is flat, the gap between the base 2 and the cover 3 provided as the adhesive layer 42 for bonding the base 2 and the cover 3 becomes narrow when the inwardly warped cover 3 is arranged on the base 2. In this case, the gap cannot be secured as designed, and a portion C where the adhesive layer 42 becomes thin may appear. When the adhesive layer 42 becomes thin, the cover and the base cannot be sufficiently sealed, which may cause poor airtightness.

Figure 12:
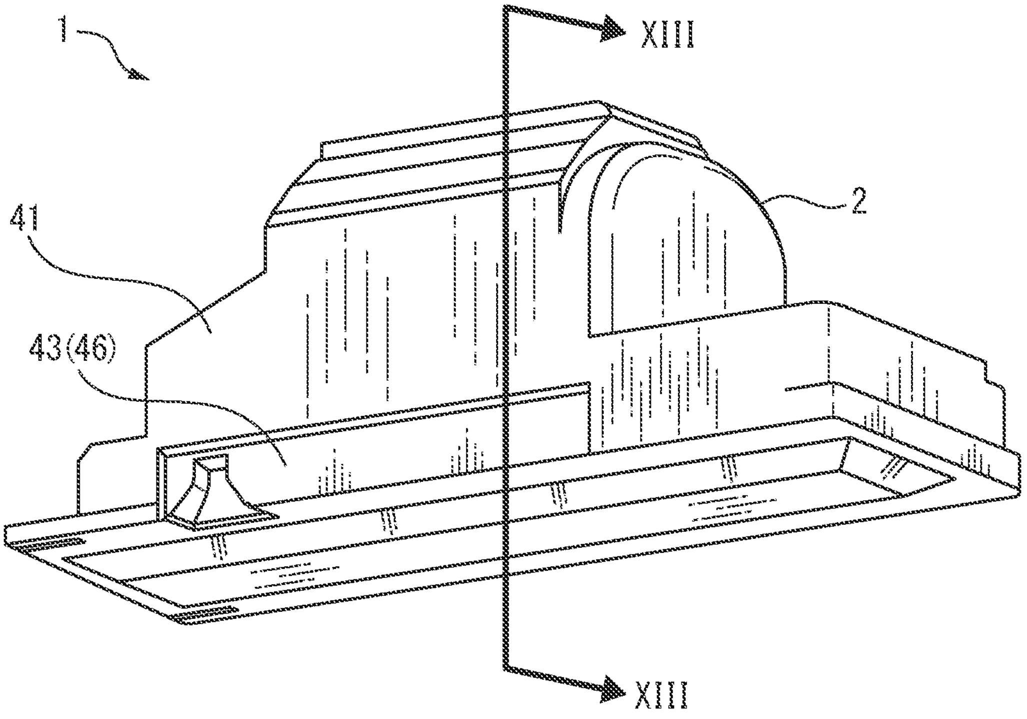
FIG. 12 is a perspective view of a base showing an example of a step.

In order to solve this problem, a step for securing the adhesive layer 42 is formed in the outside surface 41. FIG. 12 is a perspective view of an example of a base 2 in which a step 43 is formed. For example, the step 43 is a depression 46 which is one step lower than the outside surface 41. As shown in FIG. 11, the inward warping of the cover 3 becomes maximum near the middle of the opening of the cover 3. Thus, by forming the step 43 on the outside surface 41 facing the cover edge 44, and at a position near the middle 45 on the side surface of the cover 3 (refer to FIGS. 1 and 2), an adhesive layer having sufficient clearance between the inside surface 40 and the outside surface 41 can be obtained even if the cover 3 is warped inwardly.

The optimum structural ratio of the thickness of the adhesive layer 42 and the height and depth of the step 43 can be determined based on the relationship between the warp shape of the cover 3, the amount of warping, the properties of the adhesive, the bonding strength of the resin material (base, cover), etc.

Figure 13:
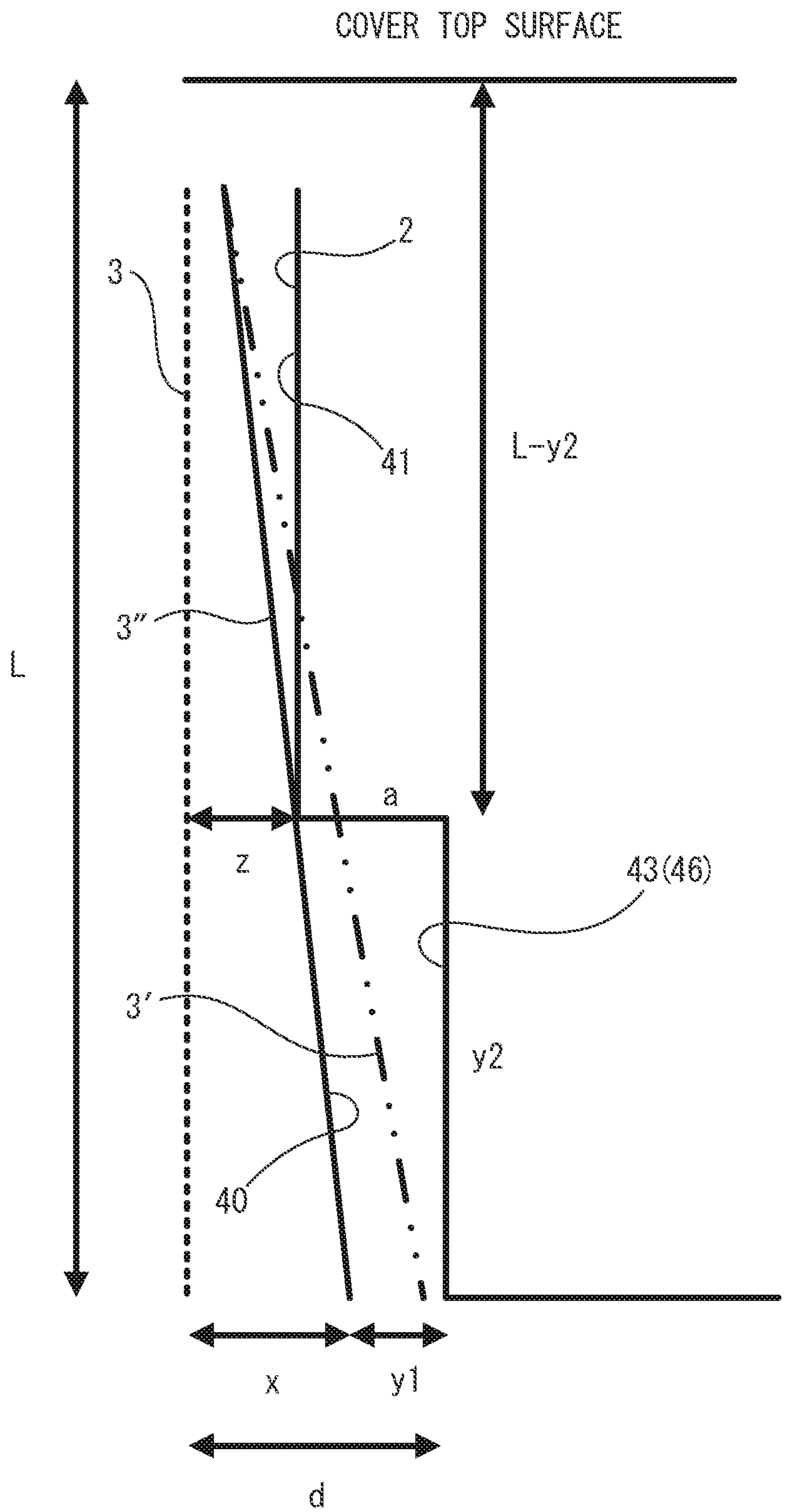
FIG. 13 is a schematic view of cross-section XIII-XIII showing an example of a base-cover structural ratio.

FIG. 13 is a schematic view of cross-section XIII-XIII showing an example of the structural ratio of the base and the cover. Reference numeral "3" indicates a cover without warping, reference numeral "3'" indicates a cover in which warping has occurred, and reference numeral "3"" indicates a cover in which warping is regulated by the step 43 formed on the outside surface 41. For example, when the design clearance z between the base 2 and the cover 3 is 0.05 mm, a target thickness y1 of the adhesive layer at the position of the cover edge 44 is 0.04 mm or more, the depth y2 of the step 43 is 1.5 mm, the height a of the step 43 is 0.1 mm, length L of the cover where warp is generated is 12.7 mm, and the cover warp amount d at the position of the cover edge 44 is 0.1 mm, the amount of warping after cover regulation x (=0.057 mm) at the position of the cover edge 44 can be determined from the following formula.

$$x = z \times \left(\frac{L}{L - y2}\right) \quad \text{[Formula 1]}$$

Further, the adhesive layer thickness (=0.093 mm) at the position of the cover edge 44 after assembly can be determined from the following formula. In the case of the above ratio, the minimum adhesive thickness is 0.093 mm, the adhesive inflow depth corresponding to the depth of the step 43 is 1.5 mm, and the target thickness y1 of 0.04 mm or more is obtained.

$$y1 = (z + a) - x \quad \text{[Formula 2]}$$

When the target thickness y1 of 0.04 mm or more cannot be obtained based on the above formula, the target thickness can be obtained by readjusting at least one of the height a and the depth y2 of the step 43. The height and depth of the step 43 may be set in this manner.

Figure 14:
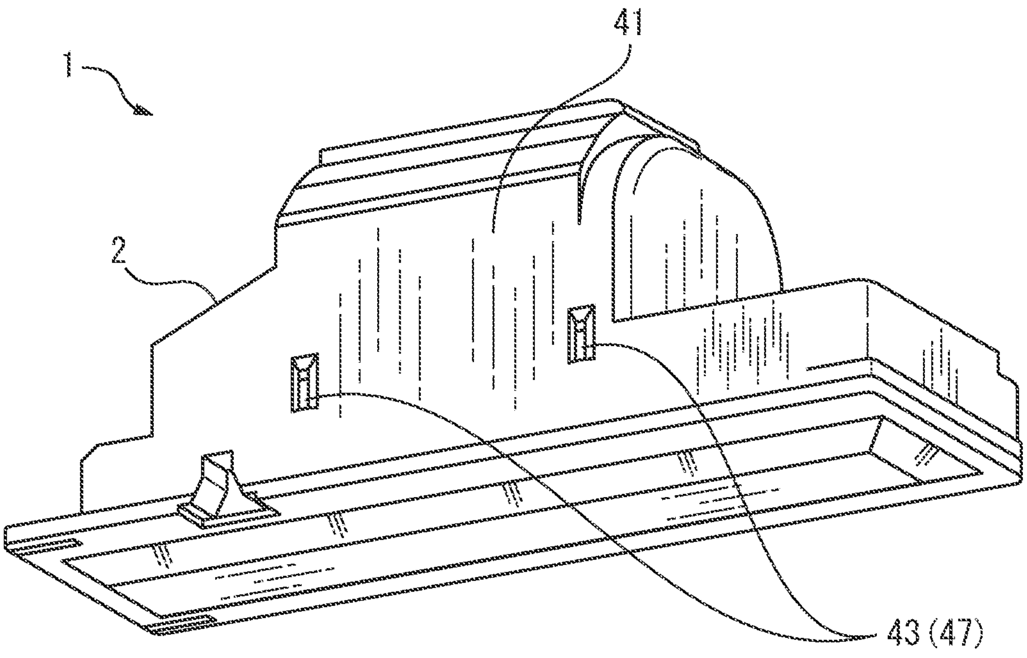
FIG. 14 is a perspective view of a base showing a modified example of a step.

The step 43 may be a protrusion 47 which projects from the outside surface 41, rather than the depression 46. FIG. 14 is a perspective view of the base 2 showing a modified example of the step 43. The protrusions 47 correct the inwardly warped cover 3 from the inside and secure the clearance between the cover and the base as designed. In the example of FIG. 14, the projections 47 are formed on the outside surface 41 on the edge 44 side of the cover and at approximately equal intervals from the middle 45 on the side surface. The heights of the protrusions 47 are appropriate for the design clearance between the base and the cover at the time of assembly. Due to the above steps 43, an adhesive layer having a sufficient clearance can be secured even if the cover is warped inwardly, and adhesive can flow from the cover edge 44 and the sealing performance of the relay 1 can be ensured. The steps 43 may be formed on the inside surface 40 rather than the outside surface 41.

Figure 15:
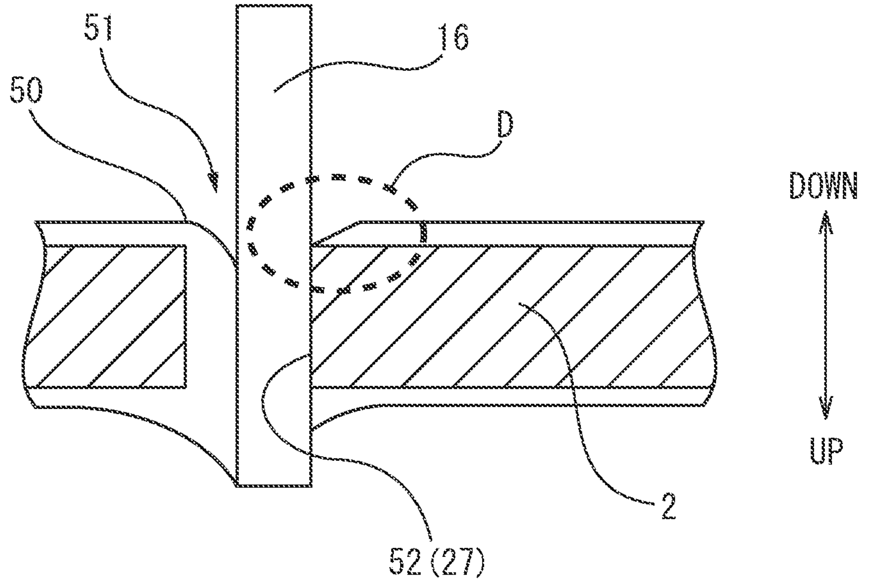
FIG. 15 PRIOR ART
FIG. 15 is a schematic cross-sectional view showing an adhesive layer between terminals and a base.

In small relays, spring terminals are often thin and there are height restrictions, so a size and area of the adhesive layer that can be obtained between the terminals and base may also be restricted. FIG. 15 is a schematic cross-sectional view showing an adhesive layer 50 between a terminal and a base. When a load is applied to the terminal 16, stress is generated in the adhesive around the terminal 16. Therefore, there is a risk that the adhesive layer 50 may peel off or cracks may occur in the adhesive layer around the terminal 16, especially when the area of the adhesive is restricted, resulting in poor airtightness. When the inside surface 52 of the insertion hole 51 into which the terminal 16 is inserted is the same surface as the reference surface 27, the terminal 16 and the reference surface 27 are in contact with each other and the adhesive hardly enters the inside surface 52. Therefore, a thin portion D where the adhesive layer becomes thin may be formed on the reference surface 27 side of the adhesive layer 50. The entire area around the terminal 16 of the base 2 may be lowered by one step to prevent occurrence of the thin portion, but because of the restrictions described above, this countermeasure is limited.

Figure 16A:
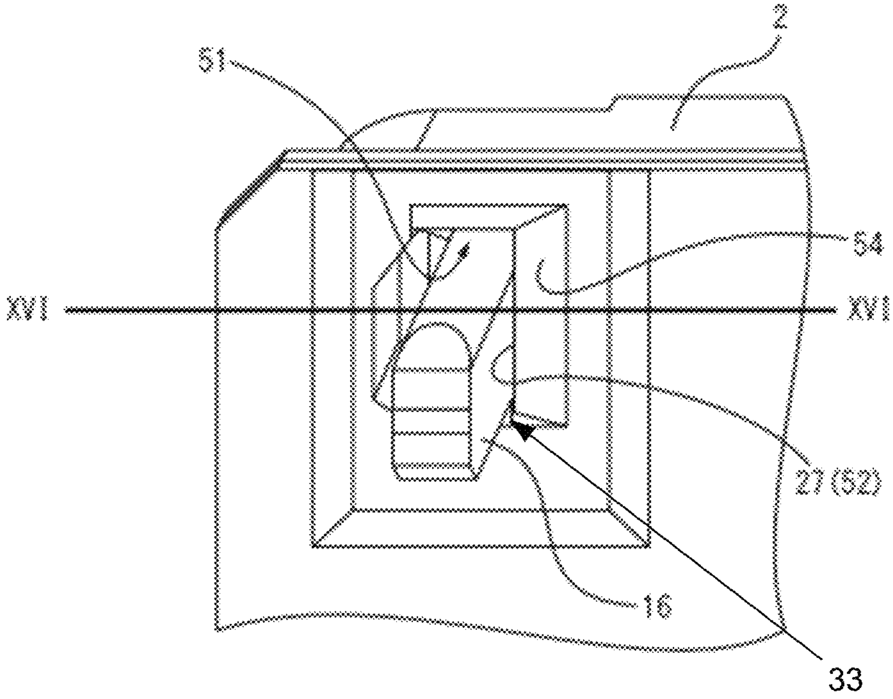
FIG. 16A is a bottom perspective view of an example of a base for which an adhesive layer is secured.
Figure 16B:
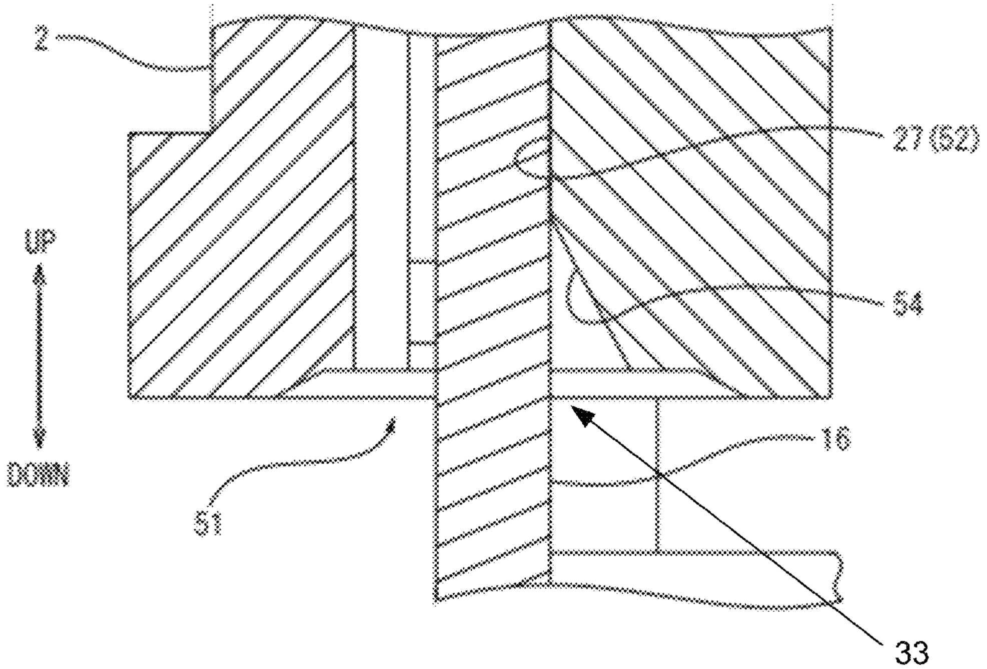
FIG. 16B is a cross-sectional view of an example of a base for which an adhesive layer is secured.

FIG. 16A is a bottom perspective view of an example of a base 2 in which an adhesive layer is secured, and FIG. 16B is a view of cross-section XVI-XVI of the base 2. In FIG. 16, an adhesive layer 50 can be secured on a lower portion of the insertion hole 51 on the reference surface 27 side. The base 2 has a notch 54 on the reference surface 27 near the terminal outlet 33 of the insertion hole 51. For example, the notch 54 has an inclined surface which is inclined with respect to the reference surface 27. By forming the inclined surface, the adhesive easily flows into the notch 54. The notch 54 may be a depression stepped down from the reference surface 27 instead of an inclined surface. The notch 54 can increase an area of the adhesive layer between the terminal and the base on the reference surface side, and the airtightness of the relay can be improved. Furthermore, the resistance to crack generation of the adhesive layer when a load is applied to the terminal 16 is improved. In addition to the notch 54, the terminal strength can be improved by lowering the entire area of the insertion hole 51 around the terminal.

Figure 17:
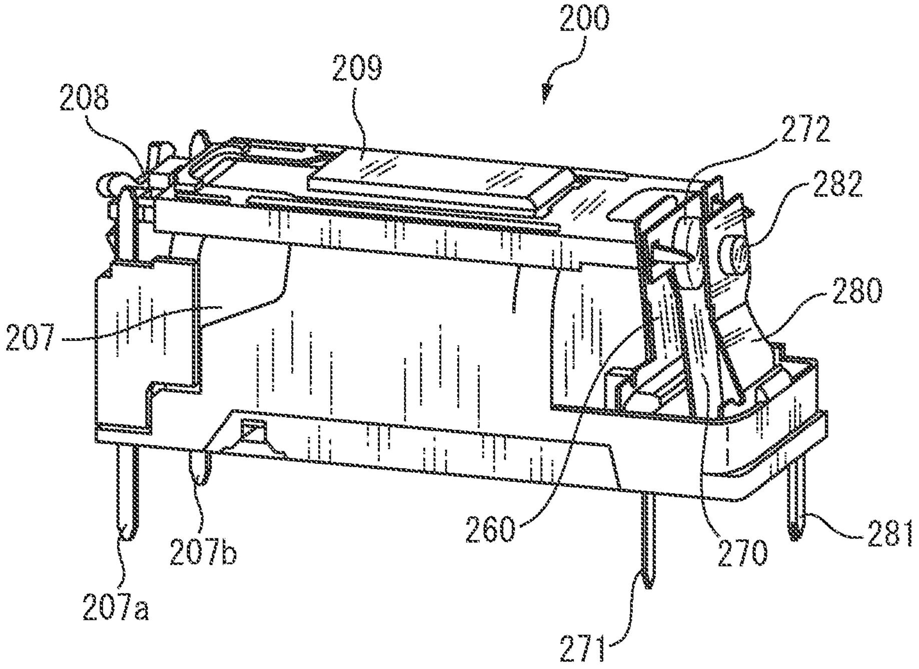
FIG. 17 is a perspective view of a relay in which the cover has been removed.
Figure 18:
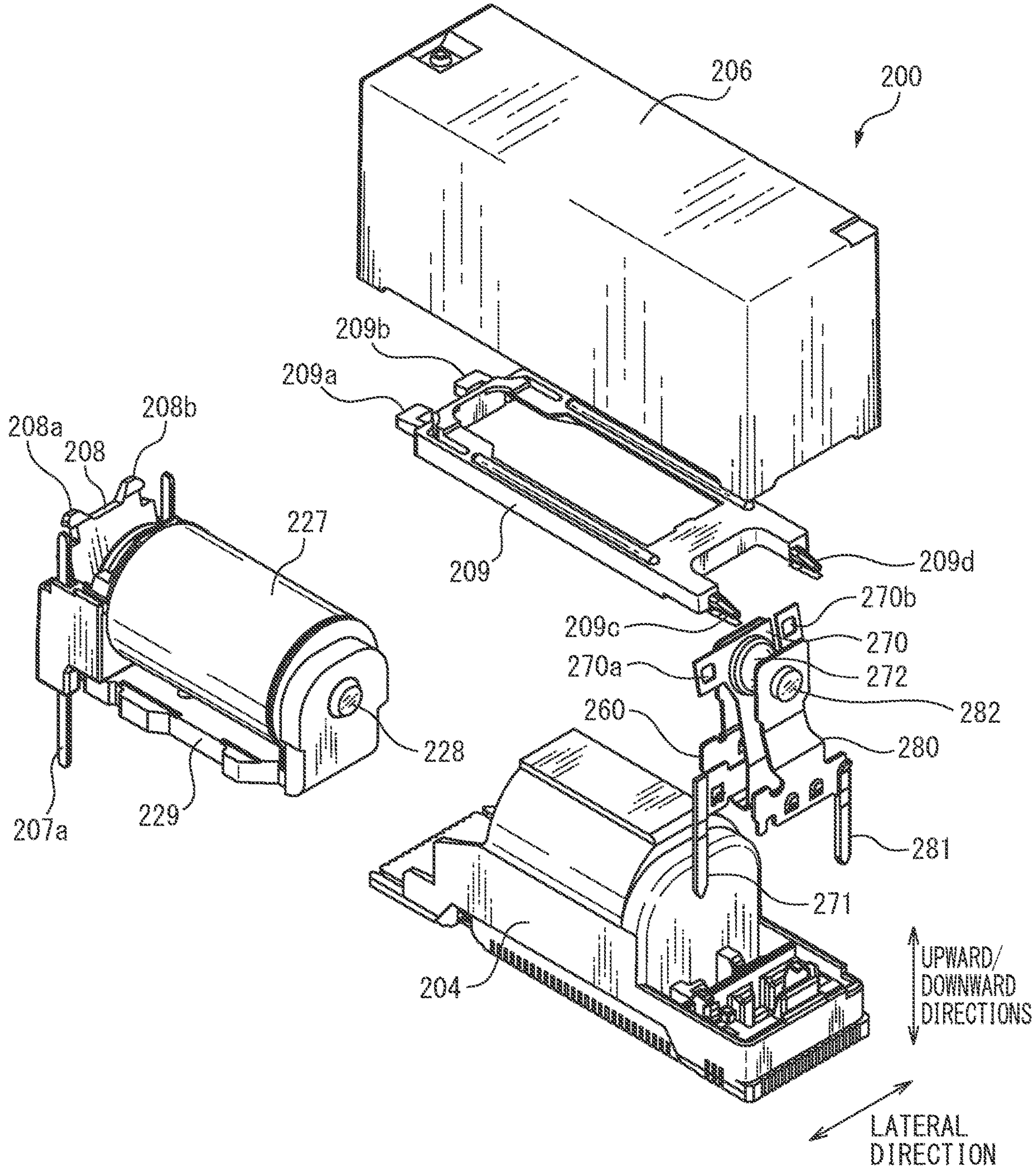
FIG. 18 is an exploded perspective view of a relay.

A slit and other structures of the movable spring will be described. FIG. 17 is a perspective view of the relay 200 with the cover removed. FIG. 18 is an exploded perspective view of the relay 200. As shown in FIGS. 17 and 18, the relay 200 comprises a base 204 on which components are assembled and a cover 206 which covers the base 204. The base 204 and the cover 206 are, for example, resin molded. The base 204 and the cover 206 form a housing. The components assembled on the base 204 include springs including the first fixed spring 260, the movable spring 270, and the second fixed spring 280, an electromagnet 207, an armature 208, and a card 209 as a moving member. Each of the springs is a metal plate-shaped spring part. The card 209 is, for example, molded from resin.

Figure 26:
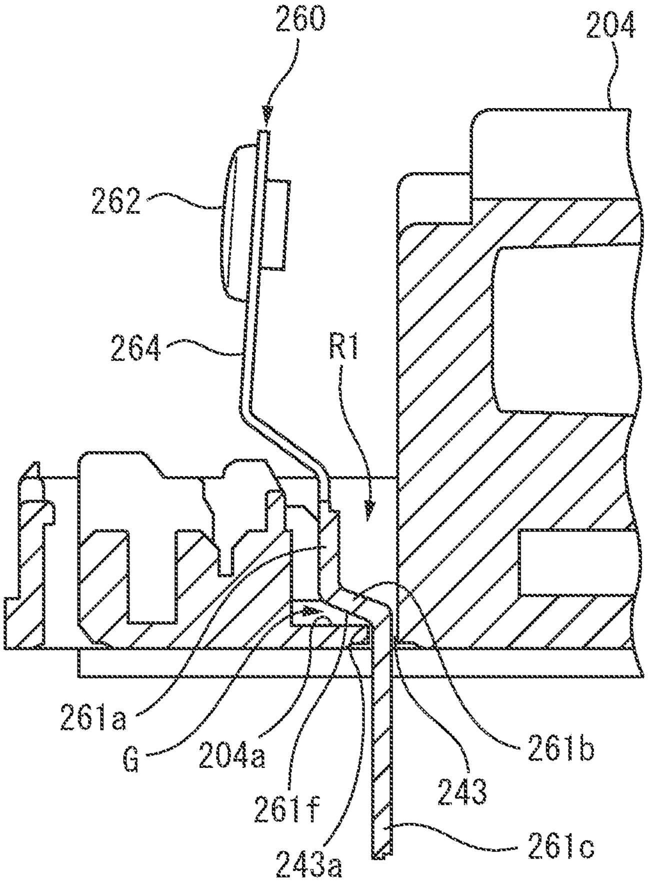
FIG. 26 is a view of cross-section XXVI-XXVI of FIG. 25.

The first fixed spring 260 comprises a terminal 261 and a first fixed contact 262 (refer to FIG. 26). The movable spring 270 comprises a terminal 271 and a movable contact 272. The second fixed spring 280 comprises a terminal 281 and a second fixed contact 282. The electromagnet 207 comprises a coil assembly 227, an iron core 228, a yoke 229, and terminals 207*a*, 207*b*.

In the relay 200, the armature 208 swings and is attracted to the iron core 228 by applying a voltage to the terminal 207*a* and the terminal 207*b* to excite the electromagnet 207. Two protrusions 208*a*, 208*b* are formed at the upper end of the armature 208. The protrusions 208*a*, 208*b* engage with engagement claws 209*a*, 209*b* of the card 209, respectively. Two protrusions 209*c*, 209*d* are formed at the tips of the card 209, and are inserted into holes 270*a* and 270*b* formed on portions of the movable spring on both sides of the movable contact 272. As the armature 208 swings, the protrusions 209*c* and 209*d* press portions of the movable spring 270 in which the holes 270*a*, 270*b* are formed toward the second fixed spring 280. As a result, the movable contact 272 is separated from the first fixed contact 262 and comes into contact with the second fixed contact 282. A hinge spring (not illustrated) is attached to the armature 208 and the yoke 229, and elastically biases the armature 208 in a direction away from the iron core 228.

When the voltage application to the coil is stopped, the armature 208 returns and moves away from the iron core 228 by biasing force of the hinge spring. The pressing force applied to the movable spring 270 by the card 209 is released as the armature 208 returns, and the movable contact 272 separates from the second fixed contact 282 and comes into contact with the first fixed contact 262.

According to the above structure, the relay 200 opens and closes the first fixed contact 262 as a break contact and the movable contact 272, and opens and closes the second fixed contact 282 as a make contact and the movable contact 272. The configuration of the relay 200 described above is merely exemplary, and, another type of movement mechanism or moving member which presses the movable spring 270 in accordance with the operation of the electromagnet 207 may be used. The number of springs implemented in the relay 200 is also exemplary. For example, the number of springs may be two, including the movable spring and the fixed spring.

Figure 19:
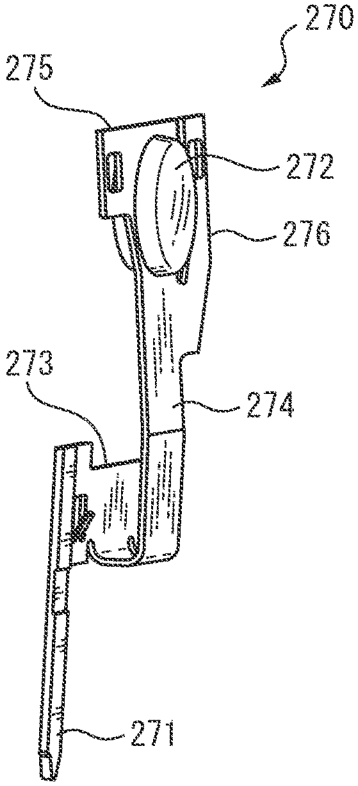
FIG. 19 is a perspective view of a movable spring.
Figure 20:
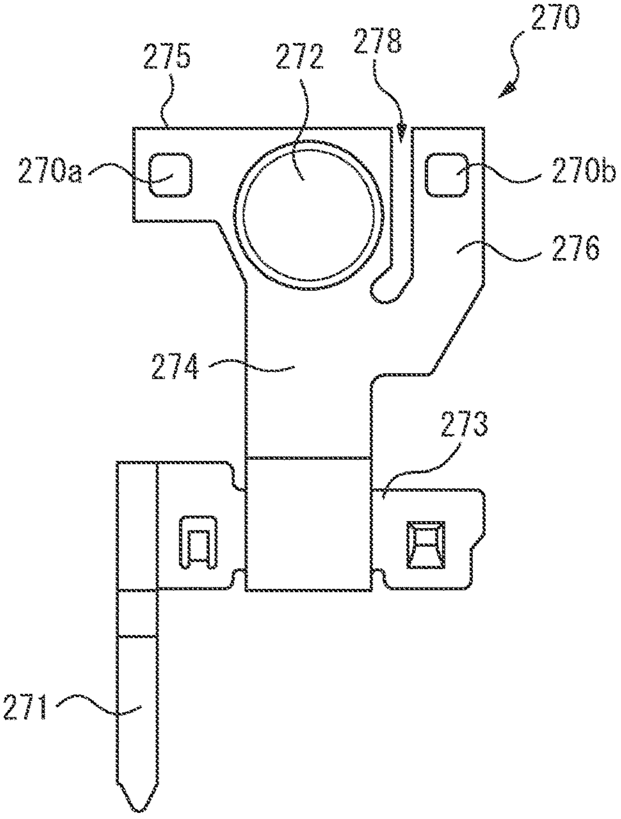
FIG. 20 is a front view of a movable spring.

FIGS. 19 and 20 are a perspective view and a front view of the movable spring 270, respectively. As shown in FIGS. 19 and 20, the movable spring 270 comprises a flat plate-like base part 273 supported by the base 204, a terminal 271 extending downward from one end of the base part 273 in the lateral direction, and a main spring 274 which extends downward from the center of the lower end of the base part 273 and curves in a U-shape and extends upward. The main spring 274 has a movable contact 272 at an upper end thereof. An elongated part 275 is formed at a portion of the upper end of the main spring 274 to which the movable contact 272 is attached. The elongated part 275 extends linearly toward the position where it is pressed by the protrusion 209*c*, and a hole 270*a* is formed at the tip thereof. A branch part 276 is formed at a portion of the main spring 274 between the movable contact 272 and the base part 273, on the side opposite the elongate part 275 with respect to the movable contact 272. The branch part 276 is bifurcated to extend to approximately the same height as the upper end of the main spring 274. The branch part 276 has a hole 270*b* formed at the tip. A slit 278 is formed between the branch part 276 and the portion of the main spring 274 to which the movable contact 272 is attached.

By forming the slit 278 at the upper end portion of the movable spring 270 at one side of the movable contact 272 as described above, a lateral movement can be added to the movable contact 272 contacting the second fixed contact 282 when the upper end of the movable spring 270 is pressed toward the second fixed spring 280 by the card 209, in addition to vertical sliding. As a result, rolling movement can be added to the contact operation of the contact. The effect of forming the slit 278 will be described with reference to FIGS. 21A to 21C and FIG. 22.

Figure 21A:
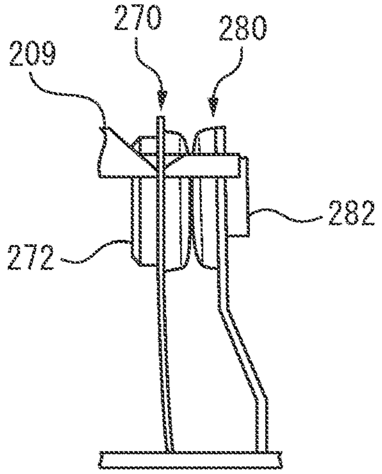
FIG. 21A is a side view showing a state in which a movable spring begins to contact a second fixed spring.
Figure 21B:
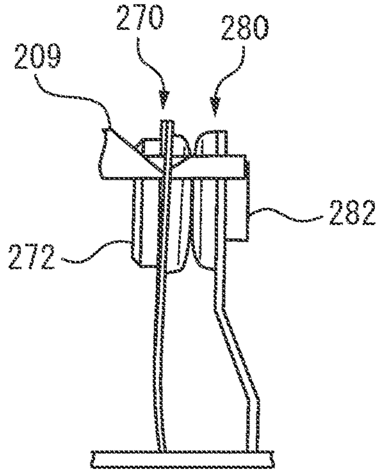
FIG. 21B is a side view showing a state in which a movable spring is completely pressed by a card.
Figure 21C:
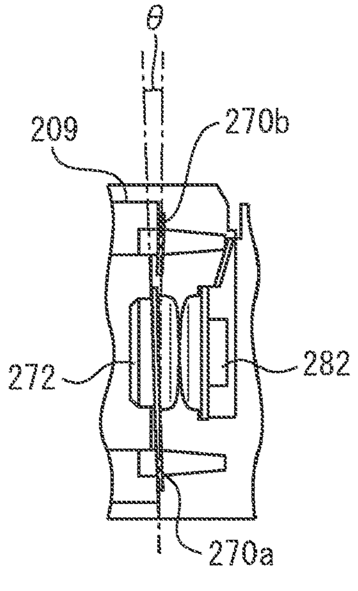

FIG. 21A is a side view showing a state in which the movable spring 270 is pressed toward the second fixed spring 280 by the card 209 and the movable contact 272 begins to come into contact with the second fixed contact 282. FIG. 21B shows a state in which the movable spring 270 is completely pressed by the card 209 from the state of FIG. 21A. FIG. 21C is a view of FIG. 21B as viewed from above. In FIG. 21C, the portion of the main spring 274 where the movable contact 272 is provided receives a pressing force from the second fixed contact 282 toward the first fixed spring 260. At this time, since the slit 278 is formed at the upper end of the movable spring 270 where the hole 207*b* is formed, the portion of the main spring 274 where the movable contact 272 is provided is twisted so that the side of the main spring 274 where the slit 278 is provided is slightly inclined toward the first fixed spring 260. As a result, as shown in FIG. 21C, the portion of the main spring 274 where the movable contact 272 is provided is inclined toward the card 209 by an angle with respect to the direction orthogonal to the movement direction of the card 209.

Figure 22:
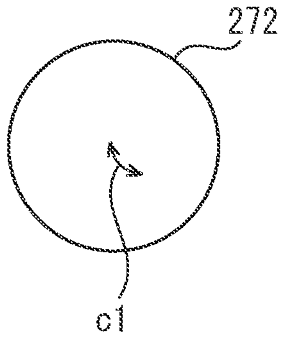
FIG. 22 is a view illustrating a rolling contact path on a movable contact.

In this manner, a lateral movement orthogonal to the movement direction and the vertical direction of the card 209 is added between the movable contact 272 and the second fixed contact 282 when the movable contact 272 and the second fixed contact 282 contacts. Such lateral movement can add a rolling motion to the movable contact 272. FIG. 22 shows an example of the contact path C1 of the second fixed contact 282 on the movable contact 272 when a rolling motion is added to the movable contact 272.

In the present embodiment, the stiffness of the movable spring 270 can be reduced by forming the slit 278 at the upper end of the movable spring 270, without taking a design in which the current-carrying capacity becomes strict, such as reducing the spring width and reduced the spring thickness. In the present embodiment, by providing the slit 278 only on one side of the movable contact 272 of the movable spring 270, it is possible to incorporate the rolling motion in the lateral direction into the contact operation between the contacts in addition to sliding in the vertical direction. As a result, it can be expected that the welding resistance of contacts at the time of contact is improved, in addition to the contact cleaning action, such as removing the oxide film on the contact surface and scraping the consumable powder. When the movable spring does not have a slit, the contacts can slide in the vertical direction, but when unevenness occurs on the contacts, the contacts receive 100% of the influence thereof. Conversely, when the slit 278 is provided only on one side of the movable contact 272 in the movable spring 270 as in the present embodiment, the upper end of the movable spring 270 is twisted in the direction of the slit 278 when the contacts come into contact with each other. Therefore, it is possible to avoid the influence of unevenness on the contact that occurs when the contacts slide, by dispersing such influence by the twist movement of the movable spring 270.

Figure 23:
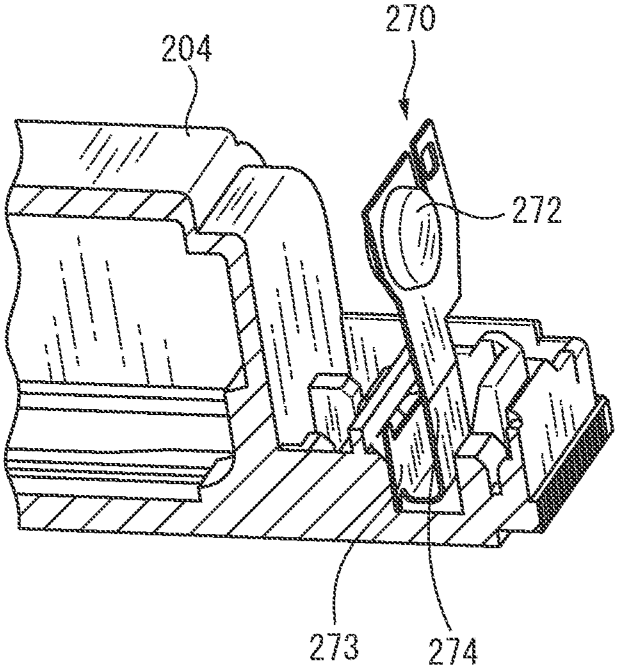
FIG. 23 is a perspective view of a relay in which a movable spring is implemented on a base.

FIG. 23 is a perspective view showing a state in which the movable spring 270 is mounted on the base 204 and the front portion thereof is cut away. The movable spring 270 is supported by the base 204 in a state in which the position is restricted by the base part 273. A portion of the terminal 271 inserted into the insertion hole 244 (FIG. 24) is adhered. The main spring 274 is formed so as to be curved in a U-shape from the lower end of the base part 273 and extend upward.

By forming the main spring 274 in a U-shape as shown in FIG. 23, the movable spring 270 can easily be mounted onto the base 204 from the vertical direction. Furthermore, by setting the deformation region of the movable spring 270 to the main spring 274 curved in a U-shape, the gap between the base part 273 and the base 204 can be increased. Accordingly, it is possible to prevent adhesive from flowing from the insertion hole 244 to the rigid point of the main spring 274, and to prevent variations in stiffness. Furthermore, the length of portion of the main spring 274 functioning as the spring can be increased as compared to the case in which the main spring is L-shaped, and resilience of the main spring 274 can be improved.

Figure 24:
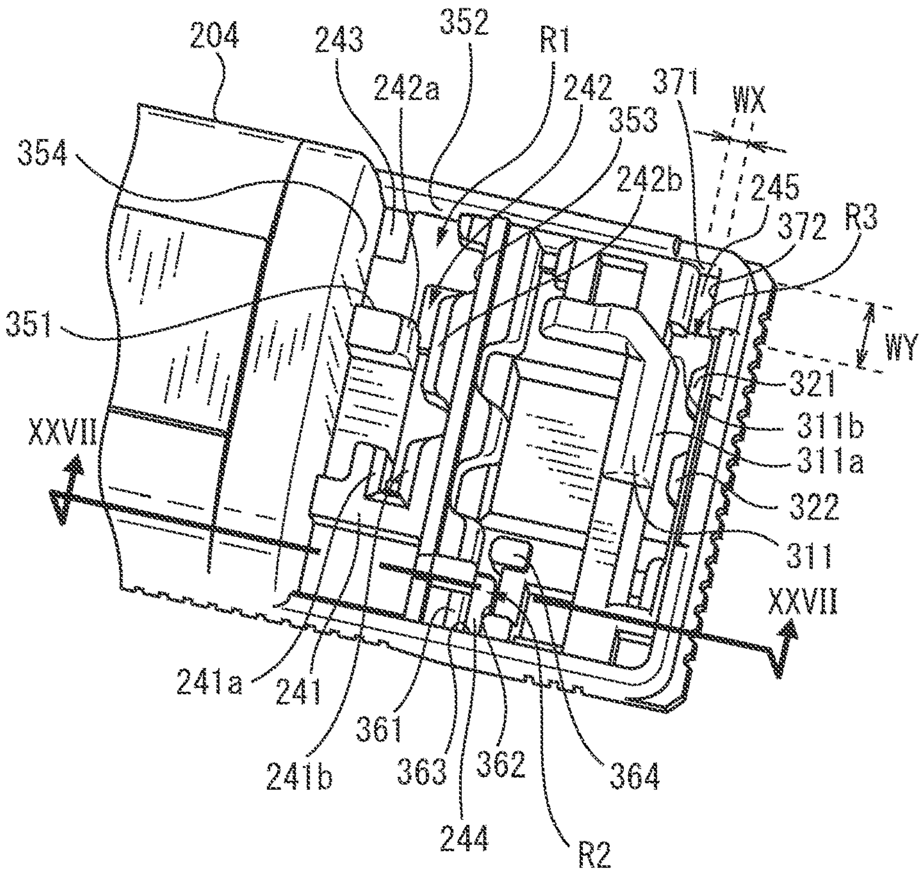
FIG. 24 is a perspective view of a portion of a base on which a first fixed spring, a movable spring, and a second fixed spring are implemented.
Figure 25:
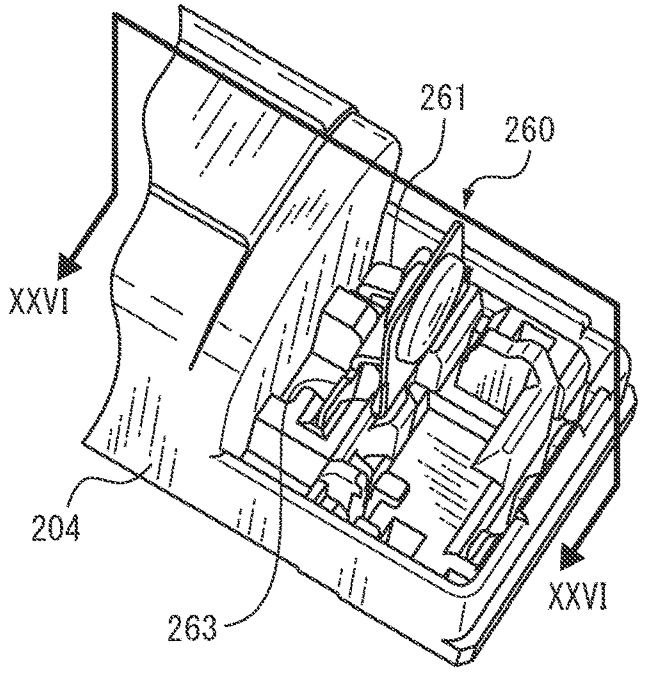
FIG. 25 is a partial perspective view of a base in which a first fixed spring is implemented.

FIG. 24 is a perspective view of the portion of the base 204 on which the first fixed spring 260, the movable spring 270, and the second fixed spring 280 are implemented. FIG. 25 is a perspective view of the base 204 in a state in which the first fixed spring 260 is mounted. FIG. 26 is a view of cross-section XXVI-XXVI of FIG. 25. The first fixed spring 260 comprises the terminal 261, the base part 263 which is supported by the base 204, and the spring part 264 which extends from the base part 263 and which has the first fixed contact 262 on the tip side thereof.

As shown in FIG. 24, a first support part 241 and a second support part 242 which support the base part 263 are formed on the bottom surface of the base 204. The first support part 241 has reference surfaces 241*a*, 241*b* which define the position of the base part 263 in the movement direction of the card 209. The second support part 242 has reference surfaces 242*a*, 242*b* which define the position of the base part 263 in the movement direction of the card 209. An insertion hole 243 for inserting the terminal 261 of the first fixed spring 260 is formed in the bottom wall of the base 204. As shown in FIG. 25, the first fixed spring 260 is mounted on the base 204 from above so that the base part 263 is supported by the first support part 241 and the second support part 242, and the terminal 261 passes through the insertion hole 243. The terminal 261 is affixed to the base 204 by pouring adhesive from the outside of the insertion hole 243 in a state in which the first fixed spring 260 is attached to the base 204.

As shown in FIG. 24, a recess R1 is formed in the area of the base 204 where the terminal 261 is arranged. The recess R1 is formed by the outer surface 351 on the insertion hole 243 side of the second support part 242, the side wall surface 352, the wall surface 353 on the movable spring 270 side, and the wall surface 354 on the electromagnet 207 side. The insertion hole 243 is formed in the bottom of the recess R1. The recess R1 suppresses the inflow of adhesive from the outside into the terminal insertion region due to surface tension.

As shown in FIG. 26, the terminal 261 has a crank-like bent shape. The terminal 261 comprises a first portion 261*a* extending downward from the base part 263, a second portion 261*b* extending obliquely downward from the lower end of the first part 261*a*, and a third portion 261*c* bending downward from the tip of the second part 261*b*. The gap G between the surface 261*f* of the second portion 261*b* on the bottom surface 204*a* side and the bottom surface 204*a* is formed in a shape extending from the opening end 243*a* on the inner side of the insertion hole 243 toward the interior space of the relay 200. In the example of FIG. 26, the gap G is formed in a tapered shape in the cross-sectional view.

By forming the gap G so as to gradually expand from the opening end of the insertion hole 243 toward the interior space, the adhesive poured into the insertion hole 243 from the outside can be maintained in the vicinity of the insertion hole 243 by surface tension to prevent the adhesive from flowing into the interior space.

Figure 27:
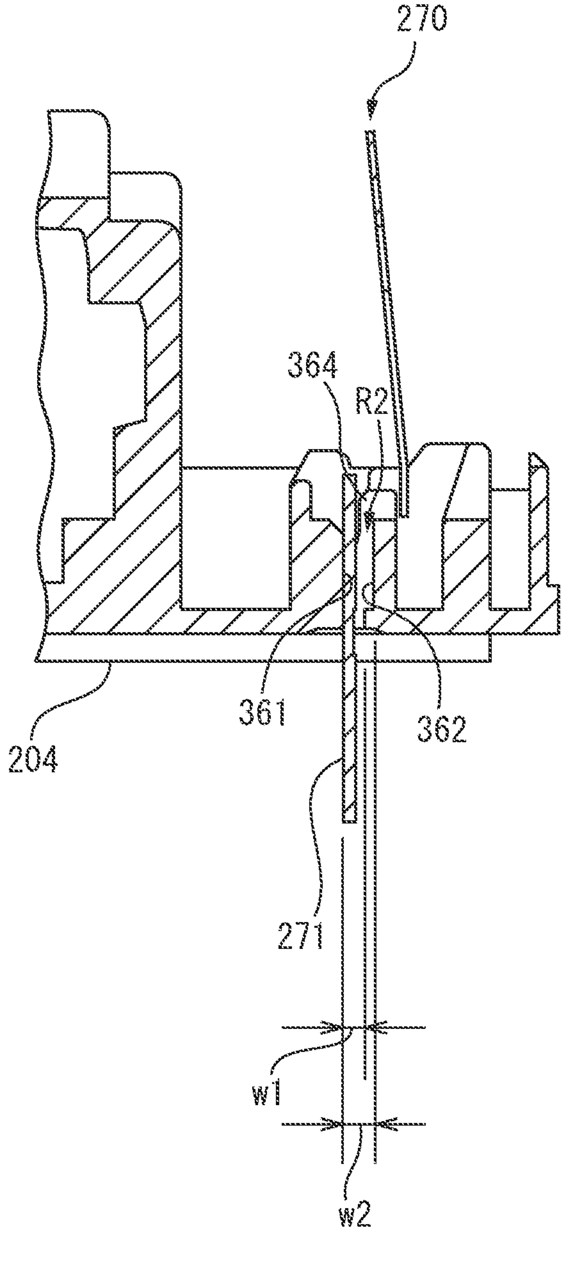
FIG. 27 is a view of cross-section XXVII-XXVII of FIG. 24.

As shown in FIG. 24, an insertion hole 244 for inserting the terminal 271 is formed in the bottom wall of the base 204. FIG. 27 is a view of cross-section XXVII-XXVII of FIG. 24 of the base 204 on which the movable spring 270 is mounted. As shown in FIG. 27, a recess R2 is provided in a portion of the insertion hole 244 where the terminal 271 is arranged.

The recess R2 is defined by the wall surfaces 361, 362 located on both sides in the movement direction of the card 209 with respect to the terminal 271, the wall surface 363 on the front side in FIG. 24, and the peripheral surface of a protrusion 364. The recess R2 has a width W2 greater than the width W1 of the opening end of the insertion hole 244. By forming the recess R2 on the portion where the insertion hole 244 is located with a size greater than the opening end of the insertion hole 244, the adhesive poured into the insertion hole 244 from the outside can be retained inside the insertion hole 244 by surface tension to prevent the adhesive from flowing into the interior space.

As shown in FIG. 24, a recess R3 is provided in the area of the base 24 where the insertion hole 245 is provided. The recess R3 has a large spatial size as compared with the width WX in the short side direction and the width WY in the long side direction of the rectangular insertion hole 245. The recess R3 is defined by the inner surfaces 371, 372 of the base 204, and the side surface 311*b* of the insertion hole 245 side of a regulation part 311. By forming such recess R3, the adhesive poured into the insertion hole 245 from the outside can be retained inside the insertion hole 245 by surface tension and can be prevented from flowing into the interior space.

Figure 28:
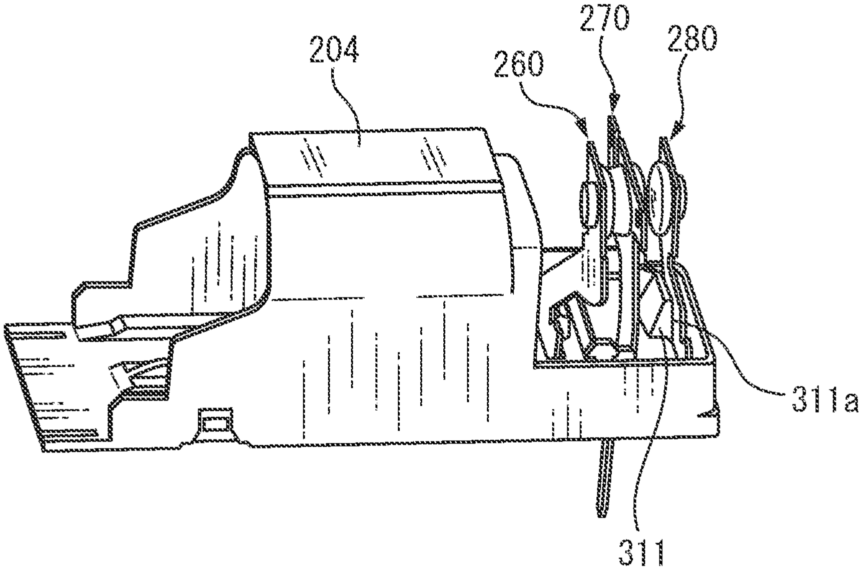
FIG. 28 is a perspective view showing an initial state of a first fixed spring, a movable spring, and a second fixed spring.
Figure 29:
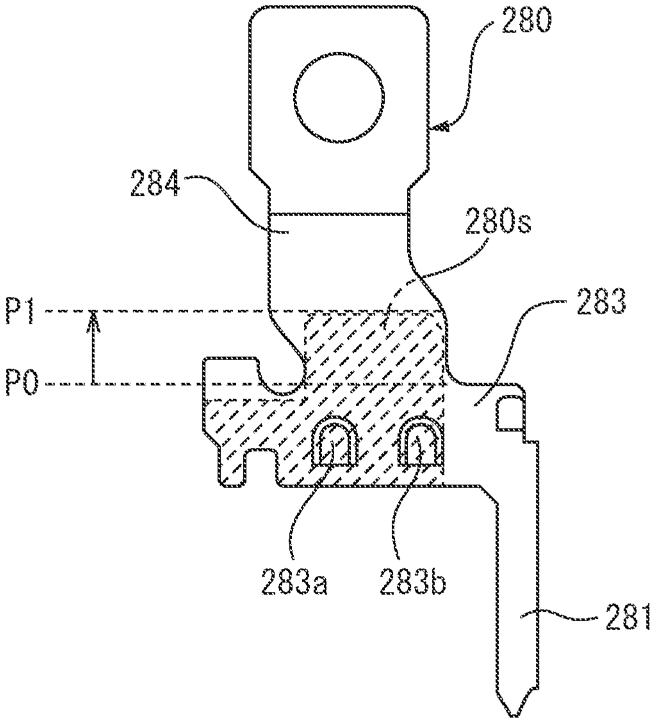
FIG. 29 is a front view of a second fixed spring.

FIG. 28 is a perspective view showing the initial states of the first fixed spring 260, the movable spring 270, and the second fixed spring 280 mounted on the base 204 when the pressing force from the card 209 is not exerted thereon. FIG. 29 is a front view of the second fixed spring 280 as viewed from the right side of FIG. 28.

The second fixed spring 280 comprises a terminal 281 inserted into the insertion hole 245 formed in the base 204, a base part 283 supported by the base 204, and a spring part 284. In the base 204, the regulation part 311 having a reference surface 311*a* in contact with the card 209 side surface of the spring part 284 in the initial state of FIG. 28 is formed so as to stand upright from the inside of the bottom wall. When the excitation of the electromagnet is turned off and the card 209 returns to the initial position from the state in which the electromagnet 207 is operated and the second fixed spring 280 is pressed by the movable spring 270, the card 209 loses the force to press the second fixed spring 280. In reaction thereto, the second fixed spring 280 returns quickly to the card 209 side and deflects to come closer to the movable contact 272 than in the initial position. The regulation part 311 regulates the movement of the second fixed spring 280 that deflects toward the card 209 due to the reaction when the second fixed contact 282 returns to the initial state from the state in which the second fixed spring 282 is pressed by the movable contact 272 so that the second fixed spring 280 is deflected in the direction opposite to the card 209.

Regulation parts 321, 322 are formed on the base 204 on the side opposite the regulation part 311 with respect to the base part 283. Each of the regulation parts 321, 322 comes in contact with projections 283*a*, 283*b* of the base part 283, respectively, to regulate the position of the base part 283 (FIG. 24). With this structure, the second fixed spring 280 is elastically deformed so that the entire spring part 284 deflects to the side opposite to the card 209 with the boundary P0 (FIG. 29) between the spring part 284 and the base part 283 as a swing fulcrum, when the second fixed spring 280 is pressed by the movable spring 270.

The reference surface 311*a* abuts the spring part 284 over a position P1 higher than the boundary position P0 in the height direction. The height of the regulation part 311 on the movable spring 270 side with respect to the second fixed spring 280 is higher than the height on the opposite side. In FIG. 29, the contact region 280*s* where the second fixed spring 280 and the regulation part 311 come into contact with each other is represented by hatching. With this configuration, the swing fulcrum of the second fixed spring 280 rises from the position P0 to the position P1, when the second fixed spring 280 deflects toward the card 209 due to the reaction of being pressed by the movable spring 270. Accordingly, the deformation region in the spring part 284 becomes smaller, and the stiffness of the second fixed spring 280 increases. As a result, it is possible to prevent the second fixed spring 280 from greatly deflecting toward the movable contact 272 side beyond the initial position, and the influence of the arc due to the momentary reduction of the gap between the movable contact 272 and the second fixed contact 282 can be reduced.

Though various embodiments have been described in the present description, the present invention is not limited to the aforementioned embodiments, and various changes can be made within the scope described in the claims.

What is claimed is:

1. A relay, comprising:

an electromagnet, a spring which includes a contact which opens and closes in accordance with operation of the electromagnet, and a terminal, and a base which supports the spring, wherein:

the base includes an insertion hole into which the terminal is inserted, and a reference surface, which is an inside surface of the insertion hole, defining a reference position of the spring, and the base includes a notch on the reference surface side near a terminal outlet of the insertion hole provided at a bottom of the base through which a front end of the terminal is exposed, so that a first width of the insertion hole in a direction perpendicular to a longitudinal direction of the insertion hole at the bottom of the base is larger than a second width of the insertion hole in the direction perpendicular to the longitudinal direction of the insertion hole at an upper part of the base where the notch is not formed.

2. The relay according to claim 1, wherein the notch extends across an entire width of the insertion hole.

3. The relay according to claim 1, wherein the notch has an inclined surface which is inclined with respect to the reference surface.

4. A relay, comprising:

an electromagnet, a spring which includes a contact which opens and closes in accordance with operation of the electromagnet, and a terminal, and a base which supports the spring, wherein:

the base includes an insertion hole into which the terminal is inserted, and a reference surface, which is an inside surface of the insertion hole, defining a reference position of the spring, and the base includes a region formed by lowering an area of the insertion hole around the terminal at a bottom of the base, so that a first width of the insertion hole in a direction perpendicular to a longitudinal direction of the insertion hole at the bottom of the base is larger than a second width of the insertion hole in the direction perpendicular to the longitudinal direction of the insertion hole at an upper part of the base where the region is not formed.

* * * * *